US012804697B2

(12) United States Patent
Elsherif et al.

(10) Patent No.: US 12,804,697 B2
(45) Date of Patent: Nov. 17, 2026

(54) ACCESS POINT (AP) SPECTRAL SCAN USING NEURAL NETWORKS (NN)

(71) Applicant: QUALCOMM Incorporated, San Diego, CA (US)

(72) Inventors: Ahmed Ragab Elsherif, San Jose, CA (US); Srinivas Katar, Fremont, CA (US); Karthikeyan Sugumaran, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 183 days.

(21) Appl. No.: 18/982,867

(22) Filed: Dec. 16, 2024

(65) Prior Publication Data

US 2026/0173126 A1 Jun. 18, 2026

(51) Int. Cl.

*H04W 72/541* (2023.01)
*H04W 16/14* (2009.01)
*H04W 28/22* (2009.01)

(52) U.S. Cl.

CPC ......... *H04W 72/541* (2023.01); *H04W 16/14* (2013.01); *H04W 28/22* (2013.01)

(58) Field of Classification Search

CPC .... H04W 72/541; H04W 16/14; H04W 28/22
See application file for complete search history.

(56) References Cited

U.S. PATENT DOCUMENTS

2018/0352473 A1* 12/2018 Gunasekara .......... H04W 28/04

* cited by examiner

*Primary Examiner* — Suhail Khan
(74) *Attorney, Agent, or Firm* — Holland & Hart LLP/Qualcomm

(57) ABSTRACT

This disclosure provides methods, components, devices and systems for access point (AP) spectral scan using neural networks (NNs). Some aspects more specifically relate to using predicted classes of interference to perform one or more operations at an AP. An AP may scan a wireless channel to obtain a set of time domain samples. The AP may, using a NN, obtain one or more predicted classes of interference associated with one or more wireless channels including the wireless channel. The AP may perform various operations in accordance with the one or more predicted classes of interference such as one or more of: a wireless channel selection operation, a network anomaly detection operation, a scheduling operation associated with communications by the AP on the wireless channel, a data rate modification operation, or other operations.

20 Claims, 7 Drawing Sheets

ACCESS POINT (AP) SPECTRAL SCAN USING NEURAL NETWORKS (NN)

TECHNICAL FIELD

This disclosure relates generally to wireless communication and, more specifically, to access point (AP) spectral scan using neural networks. An AP may utilize a neural network to predict a classification of interference associated with a wireless communication channel.

DESCRIPTION OF THE RELATED TECHNOLOGY

Wireless communication networks may include various types of wireless communication devices including network entities (such as wireless access points (AP) or base stations (BS)), client devices (such as wireless stations (STAs) or user equipment (UEs)), and other wireless nodes. These wireless communication devices may communicate with one another via a variety of technologies and wireless communication protocols, including wireless local area network (WLAN) or Wi-Fi-based protocols or cellular (such as 4G, 5G, or 6G)-based protocols. The wireless communication networks may be capable of supporting communication with multiple users by sharing the available system resources (such as time, frequency, and spatial resources). To enable features or provide improved performance, the wireless communication devices may employ technologies such as orthogonal frequency divisional multiple access (OFDMA), multi-user Multiple-Input Multiple-Output (MU-MIMO), spatial multiplexing, and beamforming. For greater inter-operability, the wireless communication networks may support backwards compatibility (such as supporting legacy wireless communication devices) as well as forward compatibility (such as supporting communication with wireless communication devices compatible with next-generation wireless communication standards).

SUMMARY

The systems, methods, and devices of this disclosure each have several innovative aspects, no single one of which is solely responsible for the desirable attributes disclosed herein.

One innovative aspect of the subject matter described in this disclosure can be implemented in an access point (AP) for wireless communications. The AP may include a processing system that includes processor circuitry and memory circuitry that stores code. The processing system may be configured to cause the AP to scan a wireless channel to obtain a set of time domain samples, obtain one or more predicted classes of interference associated with one or more wireless channels including the wireless channel, and perform, in accordance with the one or more predicted classes of interference, one or more of: a wireless channel selection operation, a network anomaly detection operation, a scheduling operation associated with communications by the AP on the wireless channel, or a data rate modification operation.

Another innovative aspect of the subject matter described in this disclosure can be implemented in a method for wireless communications by an AP. The method may include scanning a wireless channel to obtain a set of time domain samples, obtaining one or more predicted classes of interference associated with one or more wireless channels including the wireless channel, and performing, in accordance with the one or more predicted classes of interference, one or more of: a wireless channel selection operation, a network anomaly detection operation, a scheduling operation associated with communications by the AP on the wireless channel, or a data rate modification operation.

Another innovative aspect of the subject matter described in this disclosure can be implemented in another AP for wireless communications. The AP may include means for scanning a wireless channel to obtain a set of time domain samples, means for obtaining one or more predicted classes of interference associated with one or more wireless channels including the wireless channel, and means for performing, in accordance with the one or more predicted classes of interference, one or more of: a wireless channel selection operation, a network anomaly detection operation, a scheduling operation associated with communications by the AP on the wireless channel, or a data rate modification operation.

Another innovative aspect of the subject matter described in this disclosure can be implemented in a non-transitory computer-readable medium storing code for wireless communications. The code may include instructions executable by one or more processors to scan a wireless channel to obtain a set of time domain samples, obtain one or more predicted classes of interference associated with one or more wireless channels including the wireless channel, and perform, in accordance with the one or more predicted classes of interference, one or more of: a wireless channel selection operation, a network anomaly detection operation, a scheduling operation associated with communications by the AP on the wireless channel, or a data rate modification operation.

In some examples of the method, APs, and non-transitory computer-readable medium described herein, obtaining the one or more predicted classes of interference may include operations, features, means, or instructions for inputting an output of a fast Fourier transform (FFT) operation performed on the set of time domain samples to a neural network that may be trained to output one or more predicted classes of interference associated with one or more wireless channels including the wireless channel, where the one or more predicted classes of interference may be output by the neural network.

In some examples of the method, APs, and non-transitory computer-readable medium described herein, inputting the output of the FFT operation may include operations, features, means, or instructions for inputting a set of multiple sample sets associated with the output of the FFT operation, where each sample set of the set of multiple sample sets corresponds to a sub channel of the wireless channel, and where performing the wireless channel selection operation, the network anomaly detection operation, or the scheduling operation may be in accordance with a set of multiple predicted classes of interference that may be output by the neural network in accordance with inputting the set of multiple sample sets.

In some examples of the method, APs, and non-transitory computer-readable medium described herein, performing the scheduling operation may include operations, features, means, or instructions for puncturing a respective sub-channel of the wireless channel in accordance with the one or more predicted classes of interference, an interference power level associated with the one or more predicted classes of interference, a duration associated with the one or more predicted classes of interference, one or more puncturing pattern rules, or any combination thereof, where the one or more predicted classes of interference may be associated with the respective sub-channel and may be included in the set of multiple predicted classes.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
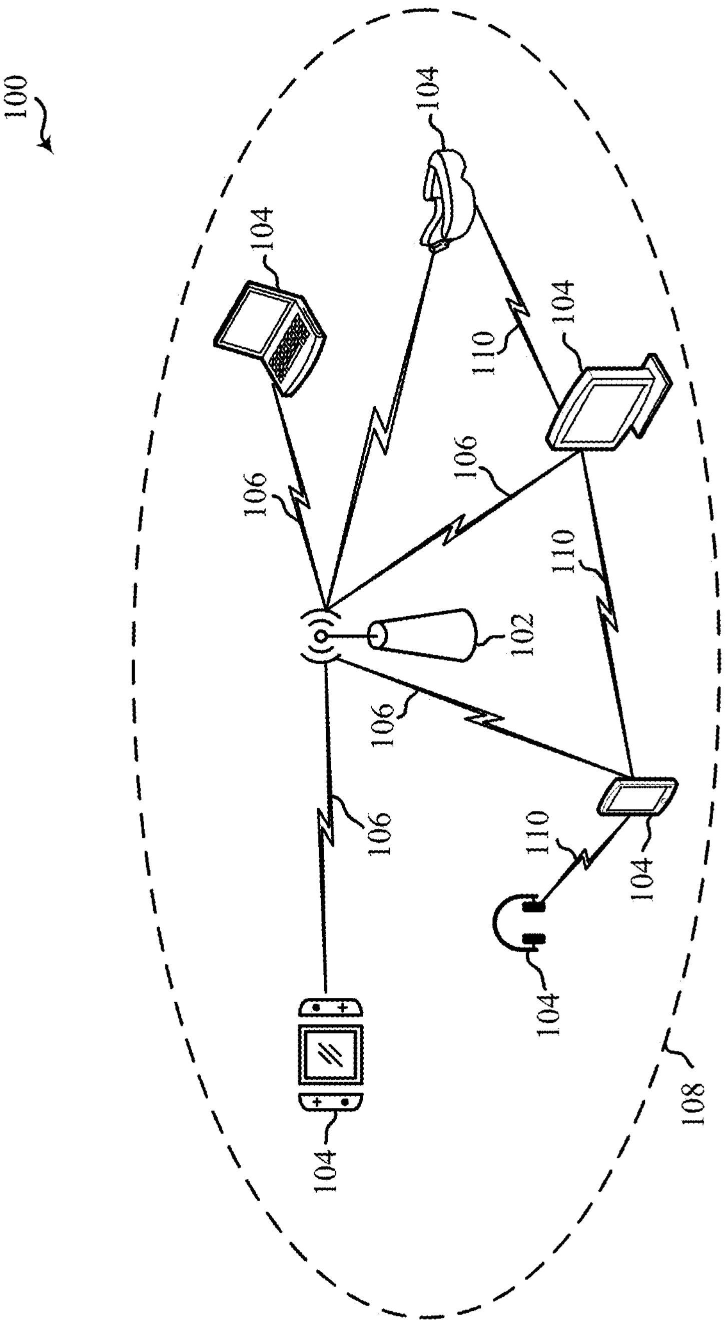
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others.

The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IOT) network.

In some wireless communication networks, an access point (AP) may perform a spectral scan to detect an availability or a quality of a wireless communication channel (such as a Wi-Fi channel). For instance, the AP may perform a spectral scan to determine whether a candidate channel is associated with interference as well as a classification (such as a type, or a class) of the interference (if detected). Accordingly, the AP may use the spectral scan to perform various operations, such as selecting a channel for communicating with one or more wireless stations (STAs). However, some methods of interference classification may utilize a relatively large quantity of samples in order to accurately classify the detected interference, which may result in increased processing overhead and increased latency. Moreover, some interference classification methods may include using multiple sets of rules for identifying each class of interference (such as a first set of rules used for identifying a first class of interference, a second set of rules used for identifying a second class of interference, and so on), such that a specific set of rules may be defined for each class of interference that is introduced in a wireless network environment. Thus, such methods may result in increased development costs, increased latency, increased power consumption, and other negative effects on the wireless network environment.

Various aspects relate generally to one or more techniques for an AP to utilize a neural network (such as a neural network represented by a machine learning (ML) model or an artificial intelligence (AI) model) that is trained to predict a classification of interference associated with a wireless channel. Some aspects more specifically relate to inputting a set of samples that are output from a fast Fourier transform (FFT) operation (such as an FFT image including spectral information over a duration) to the neural network. Accordingly, the AP may be enabled to perform one or more operations in accordance with the predicted class of interference. For example, the AP may scan a wireless channel (such as by performing a spectral scan) to obtain a set of time domain samples and may perform an FFT operation on the time domain samples. The AP may input the output of the FFT operation (such as the FFT image) to the neural network, which may predict an interference class of the wireless channel. In some examples, the AP may use the one or more predicted interference classes to select a wireless channel (such as channel selection or frequency planning operations) for communicating with one or more STAs (or other devices), to identify one or more network anomalies and report such anomalies to a user, to perform one or more scheduling operations (such as bandwidth management operations or rate adaptation), and other operations. In some examples, the AP may input multiple sample sets (such as multiple FFT images) each associated with respective sub-bands of a wireless channel to the neural network to predict a class of interference on each sub-band.

Particular aspects of the subject matter described in this disclosure can be implemented to realize one or more of the following potential advantages. In some examples, by obtaining a predicted class of interference (such as by using a neural network), the described techniques can reduce a quantity of samples used for interference evaluations at the AP (or some other device), resulting in reduced energy consumption, reduced CPU utilization, and reduced latency. Moreover, by predicting a class of interference, the described techniques can reduce a complexity of one or more rule sets used by a device for evaluating interference (such as evaluation heuristics), resulting in reduced processing overhead, reduced development and maintenance costs. Accordingly, devices within a wireless network may operate with increased efficiency, reduced latency, and improved communication reliability.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards, such as defined by the IEEE 802.11-2020 specification or amendments thereof (including, but not limited to, 802.11ay, 802.11ax (also referred to as Wi-Fi 6), 802.11az, 802.11ba, 802.11bc, 802.11bd, 802.11be (also referred to as Wi-Fi 7), 802.11bf, and 802.11bn (also referred to as Wi-Fi 8)) or other WLAN or Wi-Fi standards, such as that associated with the Integrated Millimeter Wave (IMMW) study group. In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including a wireless access point (AP) 102 and any number of wireless stations (STAs) 104. While only one AP 102 is shown in FIG. 1, the wireless communication network 100 can include multiple APs 102 (such as in an extended service set (ESS) deployment, enterprise network or AP mesh network), or may not include any AP at all (such as in an independent basic service set (IBSS) such as a peer-to-peer (P2P) network or other ad hoc network). The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as an infrastructure basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an ESS including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA

104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or P2P networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple subbands and frequency channels (also referred to as subchannels). The terms "channel" and "subchannel" may be used interchangeably herein, as each may refer to a portion of frequency spectrum within a frequency band (such as a 20 MHz, 40 MHz, 80 MHz, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (such as for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (such as UHR- or IEEE 802.11bn-compatible) devices for opportunistic access to spectrum that may be otherwise under-utilized.

Puncturing is a wireless communication technique that enables a wireless communication device (such as either an AP 102 or a STA 104) to transmit and receive wireless communications over a portion of a wireless channel exclusive of one or more particular subchannels (hereinafter also referred to as "punctured subchannels"). Puncturing specifically may be used to exclude one or more subchannels from the transmission of a PPDU, including the signaling of the preamble, to avoid interference from a static source, such as an incumbent system, or to avoid interference of a more dynamic nature such as that associated with transmissions by other wireless communication devices in OBSSs. The transmitting device (such as an AP 102 or a STA 104) may puncture the subchannels on which there is interference and in essence spread the data of the PPDU to cover the remaining portion of the bandwidth of the channel. For example, if a transmitting device determines (such as detects, identifies, ascertains, or calculates), in association with a contention operation, that one or more 20 MHz subchannels of a wider bandwidth wireless channel are busy or otherwise not available, the transmitting device implement puncturing to avoid communicating over the unavailable subchannels while still utilizing the remaining portions of the bandwidth. Accordingly, puncturing enables a transmitting device to improve or maximize throughput, and in some instances reduce latency, by utilizing as much of the available spectrum as possible. Static puncturing in particular makes it possible to consistently use wideband channels in environments or deployments where there may be insufficient contiguous spectrum available, such as in the 5 GHz and 6 GHz bands.

The AP 102 and the STAs 104 of the wireless communication network 100 may implement technologies, protocols or procedures compliant with current and future generations of the IEEE 802.11 family of wireless communication protocol standards, such as Extremely High Throughput (EHT) operation defined by the IEEE 802.11be standard amendment and Ultra-High Reliability (UHR) operation defined by the IEEE 802.11bn standard amendments, to enable additional capabilities or features relative to previous generations, such as devices supporting only legacy operation such as Very High Throughput (VHT) operation defined by the 802.11ac standard amendment or High Efficiency (HE) operation defined by the IEEE 802.11ax standard amendment. For example, the IEEE 802.11be standard amendment introduced 320 MHz channels, which are twice as wide as those possible with the IEEE 802.11ax standard amendment. Accordingly, the AP 102 or the STAs 104 may use 320 MHz channels enabling double the throughput and network capacity, as well as providing rate versus range gains at high data rates due to linear bandwidth versus log SNR trade-off. EHT, UHR or other newer wireless communication protocols may support flexible operating bandwidth enhancements, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz, and 320 MHz while a UHR system may enable communications spanning even greater bandwidths, such as 480 MHz, 640 MHz or greater. EHT systems may, for example, support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device (such as the AP 102 or the STA 104) operates in a contiguous 320 MHz bandwidth mode or a 160+160 MHz bandwidth mode, signals for transmission may be generated by two different transmit chains of the wireless communication device each having or associated with a bandwidth of 160 MHz (and each coupled to a different power amplifier). In some other examples, two transmit chains can be used to support a 240 MHz/160+80 MHz bandwidth mode by puncturing 320 MHz/160+160 MHz bandwidth modes with one or more 80 MHz subchannels. For example, signals for transmission may be generated by two different transmit chains of the wireless communication device each having a bandwidth of 160 MHz with one of the transmit chains outputting a signal having an 80 MHz subchannel punctured therein. In some other examples in which the wireless communication device may operate in a contiguous 240 MHz bandwidth mode, or a noncontiguous 160+80 MHz bandwidth mode, the signals for transmission may be generated by three different transmit chains of the wireless communication device, each having a bandwidth of 80 MHz. In some other examples, signals for transmission may be generated by four or more different transmit chains of the wireless communication device, each having a bandwidth of 80 MHz.

In noncontiguous examples, the operating bandwidth may span one or more disparate sub-channel sets. For example, the 320 MHz bandwidth may be contiguous and located in the same 6 GHz band or noncontiguous and located in different bands or regions within a band (such as partly in the 5 GHz band and partly in the 6 GHz band).

In some examples, the AP 102 or the STA 104 may benefit from operability enhancements associated with EHT, UHR and newer generations of the IEEE 802.11 family of wireless communication protocol standards. For example, the AP 102 or the STA 104 attempting to gain access to the wireless medium of the wireless communication network 100 may perform techniques (which may include modifications to existing rules, structure, or signaling implemented for legacy systems) such as clear channel assessment (CCA) operation based on EHT or UHR enhancements such as increased bandwidth, puncturing, or refinements to carrier sensing and signal reporting mechanisms.

In some wireless communication systems, wireless communication devices (such as an AP 102 and STAs 104 described with reference to FIG. 1) may operate via one or more wireless communication links in a frequency band higher than a sub-7 GHz (sub7, such as a 2.4 GHz frequency band, a 5 GHz frequency band, or a 6 GHz frequency band) frequency band. In some such wireless communication systems, the AP 102 and STAs 104 may communicate on a wireless communication link in a millimeter wave ("mm-Wave" or "mmW") band (such as a frequency band between 30 GHz and 300 GHz, such as a 60 GHz frequency band). A wireless communication system supporting such mmWave communications (such as AP 102 and STAs 104 in wireless communications network 100) may use integrated mmWave (IMMW) techniques to support operations in these frequency bands. To manage the relatively high attenuation losses and other path losses associated with the mmWave band, the AP 102 and STAs 104 may transmit and receive directional communications via beamforming procedures. To select or otherwise generate directional beams in the mmWave band, a wireless communication device may perform beam sweeping, searching and training operations, which may involve various training and feedback reporting packet sequences. In some wireless communication systems, a mmWave link supports data communications while a sub7 link may be used for management and control information signaling to support the mmWave communications. For example, a STA 104 may first associate with an AP 102 to establish a sub7 link, and thereafter, perform beam searching and training in the mmWave band to establish a mmWave link for the communication of data. In such examples, the sub7 link may be referred to as an anchor link.

In addition to beam searching and training procedures, an AP 102 and a STA 104, after having selected a beam pair, may perform beam management and recovery procedures, including periodic beacon-based procedures and aperiodic STA-initiated fast link recovery procedures, which may involve the use of beam recovery sequences. The AP 102 and STAs 104 may use these beam management and recovery procedures for beam sync-up and identifying broken links. When communicating via a mmWave link, the AP 102 and STAs 104 may perform various channel access procedures including contention-based access procedures, target wake time (TWT)-based access procedures (including the use of dedicated and opportunistic service periods (SPs)), scheduled-mode access procedures, and triggered-mode access procedures. The APs 102 and STAs 104 operating in the mmWave band also may support various management frame optimizations and procedures including optimizations and procedures associated with discovery, scanning, association, roaming, link setup, updates and maintenance, and the initial and continuing configuration of BSS and link-specific parameters including channel selection and rate adaptation. To support or facilitate communication in the mmWave band, the APs 102 and STAs 104 also may make use of various PHY layer enhancements, such as additional bandwidth modes, numerologies, tone plans, preamble designs, codebook designs, waveform designs, new PPDU formats or reuse of existing sub-7 GHz PPDU formats for mmWave frequencies. Particular RF and analog designs, such as RF front end designs, antenna integration designs, and conversion architecture designs, may be implemented in APs 102 and STAs 104 to support mmWave operation.

Transmitting and receiving devices AP 102 and STA 104 may support the use of various modulation and coding schemes (MCSs) to transmit and receive data in the wireless communication network 100 so as to optimally take advantage of wireless channel conditions, for example, to increase throughput, reduce latency, or enforce various quality of service (QoS) parameters. For example, existing technology (such as IEEE 802.11ax standard amendment protocols) supports the use of up to 1024-quadrature amplitude modulation (QAM), where a modulated symbol carries 10 bits. To further improve peak data rate, each of the AP 102 or the STA 104 may employ use of 4096-QAM (also referred to as "4 k QAM"), which enables a modulated symbol to carry 12 bits. 4 k QAM may enable massive peak throughput with a maximum theoretical PHY rate of 10 bps/Hz/subcarrier/spatial stream, which translates to 23 Gbps with 5/6 LDPC code (10 bps/Hz/subcarrier/spatial stream*996*4 subcarriers*8 spatial streams/13.6 μs per OFDM symbol). The AP 102 or the STA 104 using 4096-QAM may enable a 20% increase in data rate compared to 1024-QAM given the same coding rate, thereby allowing users to obtain higher transmission efficiency.

In some examples, the wireless communication network 100 may support the utilization of an ML model. ML models may be characterized in terms of types of learning that generate specific types of learned models that perform specific types of tasks. For example, different types of machine learning include supervised learning, unsupervised learning, semi-supervised learning, reinforcement learning, and other examples. ML models may be used to perform different tasks such as classification or regression, where classification refers to determining one or more discrete output values from a set of predefined output values, and regression refers to determining continuous values which are not bounded by predefined output values. For example, a classification ML model configured according to aspects of this disclosure may produce an output which includes a predicted class of interference or other type of communication traffic. Some example ML models configured for performing such tasks include ANNs such as convolutional neural networks (CNNs) and recurrent neural networks (RNNs), transformers, diffusion models, regression analysis models (such as statistical models), large language models (LLMs), decision tree learning (such as predictive models), support vector networks (SVMs), and probabilistic graphical models (such as a Bayesian network), among other examples.

The description herein illustrates, by way of some examples, how one or more tasks or problems in wireless communications may benefit from the application of one or more ML models. To facilitate the discussion, an ML model configured using an artificial neural network (ANN) is used, but it should be understood, that other types of ML models may be used instead of an ANN. Hence, unless expressly recited, subject matter regarding an ML model is not necessarily intended to be limited to an ANN solution. Further, it should be understood that, unless otherwise specifically stated, terms such "AI/ML model," "ML model," "trained ML model," "ANN," "model," "algorithm," or the like may be interchangeable.

In some examples, an AP 102 may perform a spectral scan to detect an availability and/or a quality of a wireless communication channel, which the AP 102 may use to communicate with one or more STAs 104. For instance, the AP 102 may perform a spectral scan to determine a type of interference in a wireless channel. The type of interference may include WLAN interference, continuous wave (CW) interference, frequency hopping spread spectrum (FHSS) interference, Bluetooth communication interference, millimeter wave interference (such as interference of signals operating in 45 GHz through 60 GHz band), microwave oven (MWO) interference, additive white Gaussian noise (AWGN) interference, ZigBee network interference, Thread network interference, or no interference (idle channel), or a combination thereof. However, some methods of interference classification may utilize a relatively large quantity of samples or may include using a complex set of rules for identifying each class of interference, which may increase power consumption, increase CPU utilization, and increase latency in the wireless communication network 100.

In accordance with various aspects described herein, an AP 102 may utilize a neural network (such as an ANN) that is trained to predict one or more classifications of interference associated with a wireless channel. In some examples, an AP 102 may scan a wireless channel associated a communication link 106. The AP may perform an FFT operation on the samples obtained from the scan and may input the output of the FFT operation to the neural network. The neural network may output one or more predicted classes of interference associated with the channel (such as with the communication link 106). Accordingly, the AP 102 may use the predicted interference classes to perform channel selection operations, frequency planning operations, bandwidth management operations, rate adaptation operations, to identify one or more network anomalies and report such anomalies to a user, or other operations.

Figure 2:
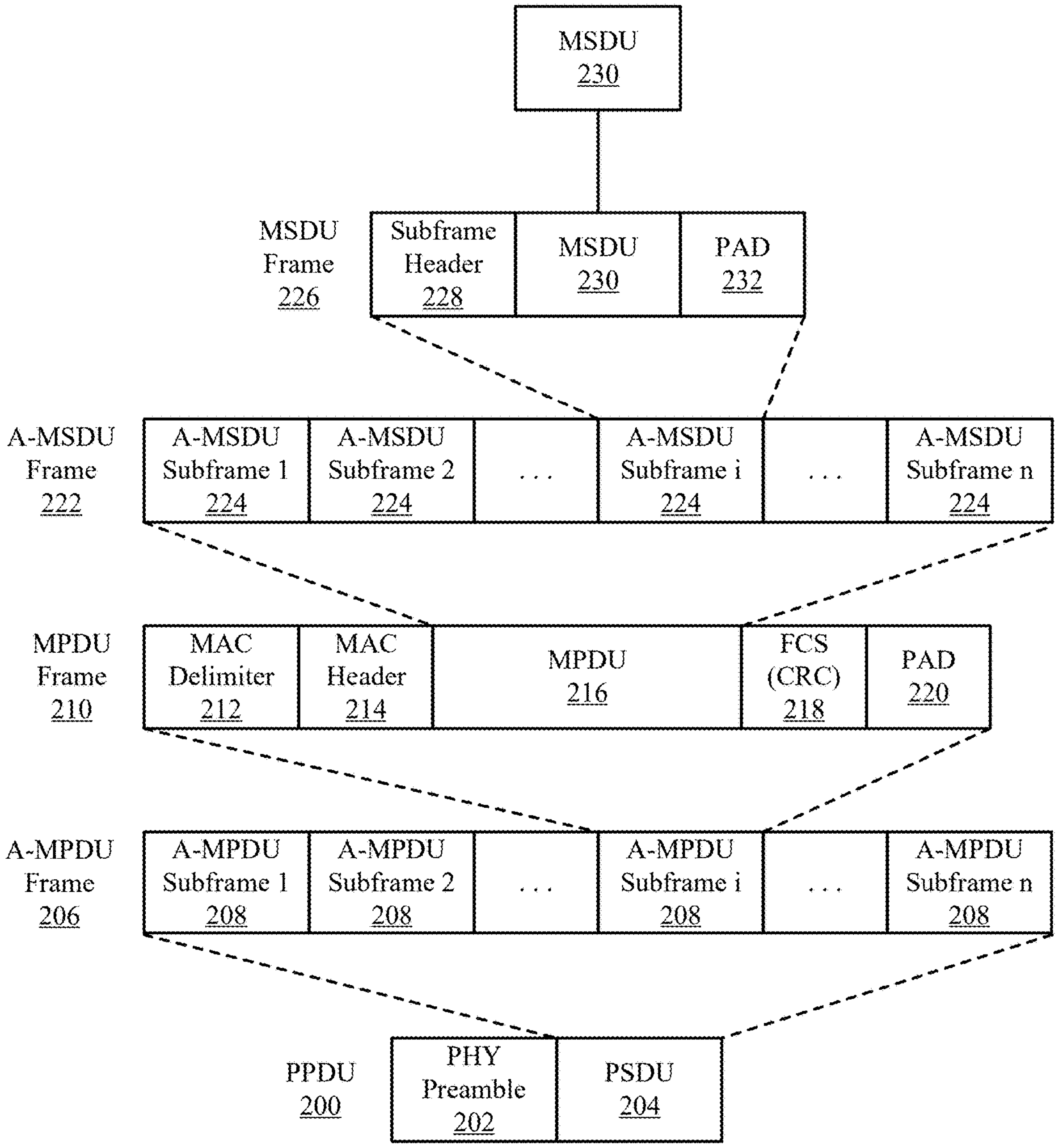
FIG. 2 shows a hierarchical format of an example PPDU usable for communications between a wireless access point (AP) and one or more wireless STAs.

FIG. 2 shows a hierarchical format of an example PPDU usable for communications between a wireless AP and one or more wireless STAs. For example, the AP and STAs may be examples of the AP 102 and the STAs 104 described with reference to FIG. 1. As described, each PPDU 200 includes a PHY preamble 202 and a PSDU 204. Each PSDU 204 may represent (or "carry") one or more MAC protocol data units (MPDUs) 216. For example, each PSDU 204 may carry an aggregated MPDU (A-MPDU) 206 that includes an aggregation of multiple A-MPDU subframes 208. Each A-MPDU subframe 208 may include an MPDU frame 210 that includes a MAC delimiter 212 and a MAC header 214 prior to the accompanying MPDU 216, which includes the data portion ("payload" or "frame body") of the MPDU frame 210. Each MPDU frame 210 also may include a frame check sequence (FCS) field 218 for error detection (such as the FCS field 218 may include a cyclic redundancy check (CRC)) and padding bits 220. The MPDU 216 may carry one or more MAC service data units (MSDUs) 230. For example, the MPDU 216 may carry an aggregated MSDU (A-MSDU) 222 including multiple A-MSDU subframes 224. Each A-MSDU subframe 224 may be associated with an MSDU frame 226 and may contain a corresponding MSDU 230 preceded by a subframe header 228 and, in some examples, followed by padding bits 232.

Referring back to the MPDU frame 210, the MAC delimiter 212 may serve as a marker of the start of the associated MPDU 216 and indicate the length of the associated MPDU 216. The MAC header 214 may include multiple fields containing information that defines or indicates characteristics or attributes of data encapsulated within the frame body. The MAC header 214 includes a duration field indicating a duration extending from the end of the PPDU until at least the end of an acknowledgement (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 214 also includes one or more fields indicating addresses for the data encapsulated within the frame body. For example, the MAC header 214 may include a combination of a source address, a transmitter address, a receiver address or a destination address. The MAC header 214 may further include a frame control field containing control information. The frame control field may specify a frame type, for example, a data frame, a control frame, or a management frame.

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (such as by generating a message integrity check (MIC) for one or more relevant fields.

Some APs and STAs (such as the AP 102 and the STAs 104 described with reference to FIG. 1) may implement spatial reuse techniques. For example, APs 102 and STAs 104 configured for communications using the protocols defined in the IEEE 802.11ax or 802.11be standard amendments may be configured with a BSS color. APs 102 associated with different BSSs may be associated with different BSS colors. A BSS color is a numerical identifier of an AP 102's respective BSS (such as a 6 bit field carried by the SIG field). Each STA 104 may learn its own BSS color upon association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or the STA 104 may apply different contention parameters in accordance with whether the wireless packet is transmitted by, or transmitted to, another wireless communication device (such another AP 102 or STA 104) within its BSS or from a wireless communication device from an overlapping BSS (OBSS), as determined, identified, ascertained, or calculated by a BSS color indication in a preamble of the wireless packet. For example, if the BSS color associated with the wireless packet is the same as the BSS color of the AP 102 or STA 104, the AP 102 or STA 104 may use a first RSSI detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed when interfering transmissions are associated with an OBSS.

Some APs and STAs (such as the AP 102 and the STAs 104 described with reference to FIG. 1) may implement techniques for spatial reuse that involve participation in a coordinated communication scheme. According to such techniques, an AP 102 may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP. The sharing AP may allocate the time or frequency segments to itself or to one or more of the shared APs. For example, each shared AP may utilize a partial TXOP assigned by the sharing AP for its uplink or downlink communications with its associated STAs.

In some examples of such TDMA techniques, each portion of a plurality of portions of the TXOP includes a set of time resources that do not overlap with any time resources of any other portion of the plurality of portions of the TXOP. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some examples of OFDMA techniques, each portion of the plurality of portions of the TXOP includes a set of frequency resources that do not overlap with any frequency resources of any other portion of the plurality of portions. In such examples, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units associated with each portion of the TXOP such as for multi-user OFDMA.

In this manner, the sharing AP's acquisition of the TXOP enables communication between one or more additional shared APs and their respective BSSs, subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to conventional CSMA/CA or enhanced distributed channel access (EDCA) techniques. Additionally, by enabling a group of APs 102 associated with different BSSs to participate in a coordinated AP transmission session, during which the group of APs may share at least a portion of a single TXOP obtained by any one of the participating APs, such techniques may increase throughput across the BSSs associated with the participating APs and also may achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs 104 associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, a receive (RX) power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may be allocated resources during the TXOP as described above.

Retransmission protocols, such as hybrid automatic repeat request (HARQ), also may offer performance gains. A HARQ protocol may support various HARQ signaling between transmitting and receiving wireless communication devices (such as the AP 102 and the STAs 104 described with reference to FIG. 1) as well as signaling between the PHY and MAC layers to improve the retransmission operations in a wireless communication network. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a wireless communication network may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (such as a negative acknowledgment (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an automatic repeat request (ARQ) protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

APs and STAs (such as the AP 102 and the STAs 104 described with reference to FIG. 1) that include multiple antennas may support various diversity schemes. For example, spatial diversity may be used by one or both of a transmitting device (such as an AP 102 or a STA 104) or a receiving device (such as an AP 102 or a STA 104) to increase the robustness of a transmission. For example, to implement a transmit diversity scheme, a transmitting device may transmit the same data redundantly over two or more antennas.

APs 102 and STAs 104 that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams. The $N_{SS}$ spatial streams may be mapped to a number $N_{STS}$ of space-time streams, which are mapped to $N_{Tx}$ transmit chains.

APs 102 and STAs 104 that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are separately encoded and transmitted in parallel via the multiple $N_{Tx}$ transmit antennas.

APs 102 and STAs 104 that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU-MIMO transmissions (also referred to as spatial division multiple access (SDMA)). In the MU-MIMO context, beamforming may additionally, or alternatively, involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (such as in the form of a null data packet (NDP)) to the beamformee. An NDP is a PPDU without any data field. The beamformee may perform measurements for each of the $N_{Tx} \times N_{Rx}$ sub-channels corresponding to all of the transmit antenna and receive antenna pairs associated with the sounding signal. The beamformee generates a feedback matrix associated with the channel measurements and, typically, compresses the feedback matrix before transmitting the feedback to the beamformer. The beamformer may generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (such as identify, detect, ascertain, calculate, or compute) how to transmit a signal on each of its antennas to perform beamforming. For example, the steering matrix may be indicative of a phase shift, or a power level, to use to transmit a respective signal on each of the beamformer's antennas.

When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions or nulls by increasing the number of transmit antennas. This is especially advantageous in MU transmission contexts in which it is particularly important to reduce inter-user interference.

To increase an AP 102's spatial multiplexing capability, an AP 102 may need to support an increased number of spatial streams (such as up to 16 spatial streams). However, supporting additional spatial streams may result in increased CSI feedback overhead. Implicit CSI acquisition techniques may avoid CSI feedback overhead by taking advantage of the assumption that the UL and DL channels have reciprocal impulse responses (that is, that there is channel reciprocity). For example, the CSI feedback overhead may be reduced using an implicit channel sounding procedure such as an implicit beamforming report (BFR) technique (such as where STAs 104 transmit NDP sounding packets in the UL while the AP 102 measures the channel) because no BFRs are sent. Once the AP 102 receives the NDPs, it may implicitly assess the channels for each of the STAs 104 and use the channel assessments to configure steering matrices. In order to mitigate hardware mismatches that could break the channel reciprocity on the UL and DL (such as the baseband-to-RF and RF-to-baseband chains not being reciprocal), the AP 102 may implement a calibration method to compensate for the mismatch between the UL and the DL channels. For example, the AP 102 may select a reference antenna, transmit a pilot signal from each of its antennas, and estimate baseband-to-RF gain for each of the non-reference antennas relative to the reference antenna.

In some examples, multiple APs 102 may simultaneously transmit signaling or communications to a single STA 104 utilizing a distributed MU-MIMO scheme. Examples of such a distributed MU-MIMO transmission include coordinated beamforming (CBF) and joint transmission (JT). With CBF, signals (such as data streams) for a given STA 104 may be transmitted by only a single AP 102. However, the coverage areas of neighboring APs may overlap, and signals transmitted by a given AP 102 may reach the STAs in OBSSs associated with neighboring APs as OBSS signals. CBF allows multiple neighboring APs to transmit simultaneously while minimizing or avoiding interference, which may result in more opportunities for spatial reuse. More specifically, using CBF techniques, an AP 102 may beamform signals to in-BSS STAs 104 while forming nulls in the directions of STAs in OBSSs such that any signals received at an OBSS STA are of sufficiently low power to limit the interference at the STA. To accomplish this, an inter-BSS coordination set may be defined between the neighboring APs, which contains identifiers of all APs and STAs participating in CBF transmissions.

With JT, signals for a given STA 104 may be transmitted by multiple coordinated APs 102. For the multiple APs 102 to concurrently transmit data to a STA 104, the multiple APs 102 may all need a copy of the data to be transmitted to the STA 104. Accordingly, the APs 102 may need to exchange the data among each other for transmission to a STA 104. With JT, the combination of antennas of the multiple APs 102 transmitting to one or more STAs 104 may be considered as one large antenna array (which may be represented as a virtual antenna array) used for beamforming and transmitting signals. In combination with MU-MIMO techniques, the multiple antennas of the multiple APs 102 may be able to transmit data via multiple spatial streams. Accordingly, each STA 104 may receive data via one or more of the multiple spatial streams.

In some implementations, the AP 102 and STAs 104 can support various multi-user communications; that is, concurrent transmissions from one device to each of multiple devices (such as multiple simultaneous downlink communications from an AP 102 to corresponding STAs 104), or concurrent transmissions from multiple devices to a single device (such as multiple simultaneous uplink transmissions from corresponding STAs 104 to an AP 102). As an example, in addition to MU-MIMO, the AP 102 and STAs 104 may support OFDMA. OFDMA is in some aspects a multi-user version of OFDM.

In OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Other tone RUs also may be allocated, such as 52 tone, 106 tone, 242 tone, 484 tone and 996 tone RUs. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

In some wireless communications systems, an AP 102 may allocate or assign multiple RUs to a single STA 104 in an OFDMA transmission (hereinafter also referred to as "multi-RU aggregation"). Multi-RU aggregation, which facilitates puncturing and scheduling flexibility, may ultimately reduce latency. As increasing bandwidth is supported by emerging standards (such as the IEEE 802.11be standard amendment supporting 320 MHz and the IEEE 802.11bn standard amendment supporting 480 MHz and 640 MHz), various multiple RU (multi-RU) combinations may exist. Values indicating the various multi-RU combinations may be provided by a suitable standard specification (such as one or more of the IEEE 802.11 family of wireless communication protocol standards including the 802.11be standard amendment and the 802.11bn standard amendment).

As Wi-Fi is not the only technology operating in the 6 GHz band, the use of multiple RUs in conjunction with channel puncturing may enable the use of large bandwidths such that high throughput is possible while avoiding transmitting on frequencies that are locally unauthorized due to incumbent operation. Puncturing may be used in conjunction with multi-RU transmissions to enable wide channels to be established using non-contiguous spectrum blocks. In such examples, the portion of the bandwidth between two RUs allocated to a particular STA 104 may be punctured. Accordingly, spectrum efficiency and flexibility may be increased.

As described previously, STA-specific RU allocation information may be included in a signaling field (such as the UHR-SIG field for a UHR PPDU) of the PPDU's preamble. Preamble puncturing may enable wider bandwidth transmissions for increased throughput and spectral efficiency in the presence of interference from incumbent technologies and other wireless communication devices. Because RUs may be individually allocated in a MU PPDU, use of the MU PPDU format may indicate preamble puncturing for SU transmissions. While puncturing in the IEEE 802.11ax standard amendment was limited to OFDMA transmissions, the IEEE 802.11be standard amendment extended puncturing to SU transmissions. In some examples, the RU allocation information in the common field of UHR-SIG can be used to individually allocate RUs to the single user, thereby avoiding the punctured channels. In some other examples, U-SIG may be used to indicate SU preamble puncturing. For example, the SU preamble puncturing may be indicated by a value of the UHR-SIG compression field in U-SIG.

In some environments, locations, or conditions, a regulatory body may impose a power spectral density (PSD) limit for one or more communication channels or for an entire band (such as the 6 GHz band). A PSD is a measure of transmit power as a function of a unit bandwidth (such as per 1 MHz). The total transmit power of a transmission is consequently the product of the PSD and the total bandwidth by which the transmission is sent. Unlike the 2.4 GHz and 5 GHz bands, the United States Federal Communications Commission (FCC) has established PSD limits for low power devices when operating in the 6 GHz band. The FCC has defined three power classes for operation in the 6 GHz band: standard power, low power indoor, and very low power. Some APs 102 and STAs 104 that operate in the 6 GHz band may conform to the low power indoor (LPI) power class, which limits the transmit power of APs 102 and STAs 104 to 5 decibel-milliwatts per megahertz (dBm/MHz) and −1 dBm/MHz, respectively. In other words, transmit power in the 6 GHz band is PSD-limited on a per-MHz basis.

Such PSD limits can undesirably reduce transmission ranges, reduce packet detection capabilities, and reduce channel estimation capabilities of APs 102 and STAs 104. In some examples in which transmissions are subject to a PSD limit, the AP 102 or the STAs 104 of a wireless communication network 100 may transmit over a greater transmission bandwidth to allow for an increase in the total transmit power, which may increase an SNR and extend coverage of the wireless communication devices. For example, to overcome or extend the PSD limit and improve SNR for low power devices operating in PSD-limited bands, 802.11be introduced a duplicate (DUP) mode for a transmission, by which data in a payload portion of a PPDU is modulated for transmission over a "base" frequency sub-band, such as a first RU of an OFDMA transmission, and copied over (such as duplicated) to another frequency sub-band, such as a second RU of the OFDMA transmission. In DUP mode, two copies of the data are to be transmitted, and, for each of the duplicate RUs, using dual carrier modulation (DCM), which also has the effect of copying the data such that two copies of the data are carried by each of the duplicate RUs, so that, for example, four copies of the data are transmitted. While the data rate for transmission of each copy of the user data using the DUP mode may be the same as a data rate for a transmission using a "normal" mode, the transmit power for the transmission using the DUP mode may be essentially multiplied by the number of copies of the data being transmitted, at the expense of requiring an increased bandwidth. As such, using the DUP mode may extend range but reduce spectrum efficiency.

In some other examples in which transmissions are subject to a PSD limit, a distributed tone mapping operation may be used to increase the bandwidth via which a STA 104 transmits an uplink communication to the AP 102. As used herein, the term "distributed transmission" refers to a PPDU transmission on noncontiguous tones (or subcarriers) of a wireless channel. In contrast, the term "contiguous transmission" refers to a PPDU transmission on contiguous tones. As used herein, a logical RU represents a number of tones or subcarriers that are allocated to a given STA 104 for transmission of a PPDU. As used herein, the term "regular RU" (or rRU) refers to any RU or MRU tone plan that is not distributed, such as a configuration supported by 802.11be or earlier versions of the IEEE 802.11 family of wireless communication protocol standards. As used herein, the term "distributed RU" (or dRU) refers to the tones distributed across a set of noncontiguous subcarrier indices to which a logical RU is mapped. The term "distributed tone plan" refers to the set of noncontiguous subcarrier indices associated with a dRU. The channel or portion of a channel within which the distributed tones are interspersed is referred to as a spreading bandwidth, which may be, for example, 40 MHz, 80 MHz or more. The use of dRUs may be limited to uplink communications because benefits to addressing PSD limits may only be present for uplink communications.

In some examples, an AP 102 may be configured to classify a type of interference in a wireless channel. For instance, an AP 102 may use interference classification to select a wireless communication channel that is associated with (or not associated with) a given type of interference. However, some methods of interference classification may be relatively complex and may increase power consumption and increase latency in the wireless communication network 100. For example, to achieve a target accuracy of classification, an AP 102 may utilize a relatively high quantity of time domain samples, which may increase processing overhead. Moreover, the AP 102 may utilize specific rule sets for each type of interference, which may be relatively costly to maintain and update. Thus, various aspects herein enable an AP 102 to perform interference classification with increased efficiency, reduced latency, and improved accuracy. In some examples, the AP 102 may utilize one or more neural networks that are trained to output one or more inferred interference classifications based on a set of time domain samples obtained by the AP. That is, the AP 102 may scan a wireless channel to obtain a set of time domain samples and may perform an FFT operation, which may output a set of frequency domain samples associated with the time domain samples. The frequency domain samples (such as an FFT image of the obtained samples) may be input (along with one or more other parameters) to the neural network. Accordingly, the neural network may output one or more predicted classes of interference associated with the wireless channel, and the AP 102 may use the predicted class to perform one or more operations described herein.

Figure 3:
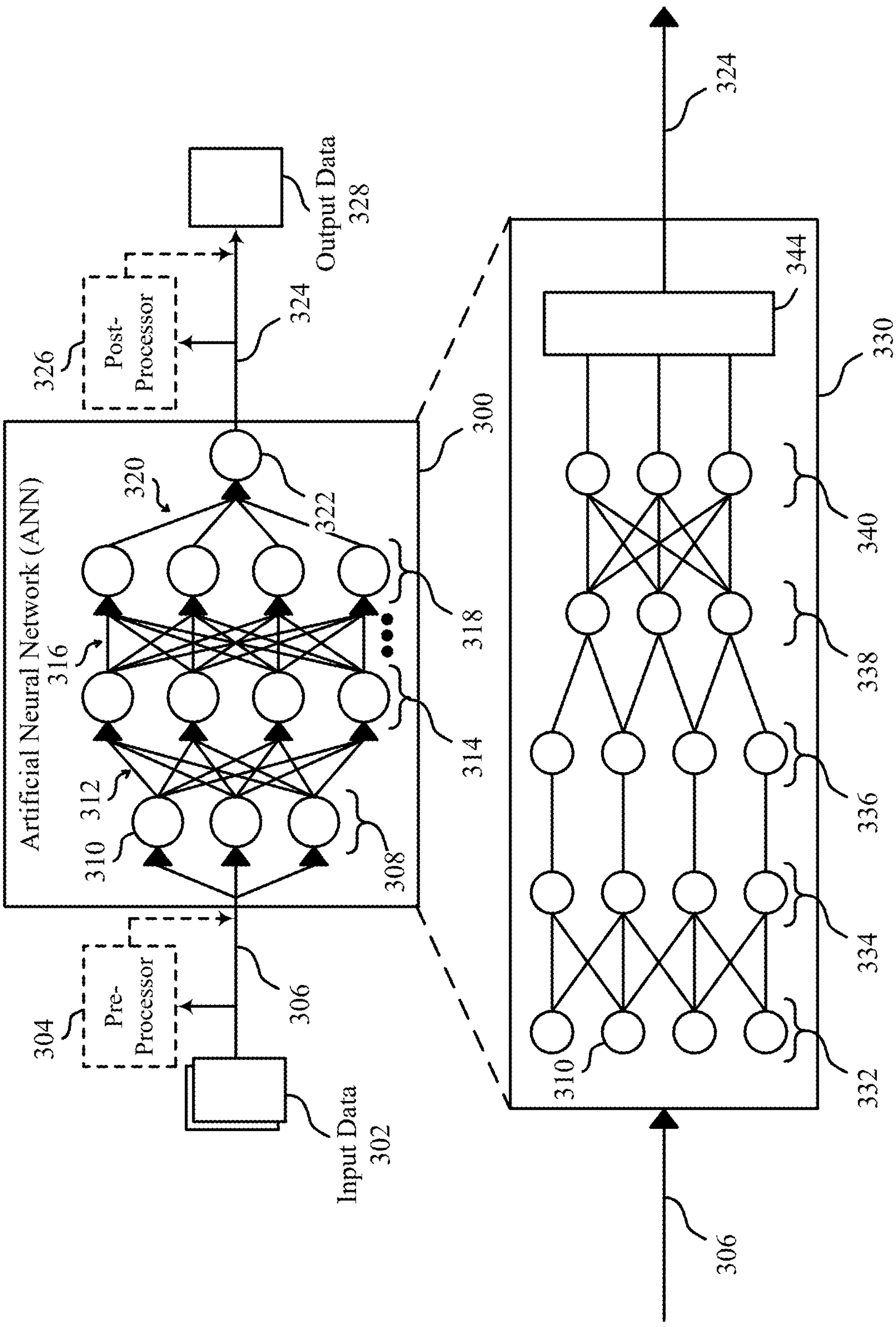
FIG. 3 shows an illustrative block diagram of an example machine learning (ML) model represented by an artificial neural network (ANN) that supports AP spectral scan using neural networks (NNs).

FIG. 3 is an illustrative block diagram of an example ML model represented by an ANN 300 that supports AP spectral scan using neural networks. The ANN 300 may receive input data 306 which may include one or more bits of data 302, pre-processed data output from pre-processor 304 (optional), or some combination thereof. Here, the data 302 may include training data, verification data, application-related data, or the like, based, for example, on the stage of deployment of the ANN 300. The pre-processor 304 may be included within ANN 300 in some other implementations. The pre-processor 304 may, for example, process all or a portion of the data 302 which may result in some of the data 302 being changed, replaced, deleted, etc. In some implementations, the pre-processor 304 may add additional data to the data 302. In some implementations, the pre-processor 304 may be a ML model, such as an ANN.

The ANN 300 includes at least one first layer 308 of artificial neurons 310 to process input data 306 and provide resulting first layer data via connections or "edges" such as edges 312 to at least a portion of at least one second layer 314. The at least one second layer 314 processes data received via edges 312 and provides second layer output data via edges 316 to at least a portion of at least one third layer 318. The at least one third layer 318 processes data received via edges 316 and provides third layer output data via edges 320 to at least a portion of a final layer 322 including one or more neurons to provide output data 324. All or part of output data 324 may be further processed in some manner by (optional) post-processor 326. Thus, in certain examples, the ANN 300 may provide output data 328 that is based on output data 324, post-processed data output from the post-processor 326, or some combination thereof.

The post-processor 326 may be included within ANN 300 in some other implementations. The post-processor 326 may, for example, process all or a portion of the output data 324 which may result in the output data 328 being different, at least in part, to the output data 324, as result of data being changed, replaced, deleted, etc. In some implementations, the post-processor 326 may be configured to add additional data to the output data 324. In this example, the second layer 314 and third layer 318 represent intermediate or hidden layers that may be arranged in a hierarchical or other like structure. Although not explicitly shown, there may be one or more further intermediate layers between the second layer 314 and the third layer 318. In some implementations, the post-processor 326 may be a ML model, such as an ANN.

The structure and training of the artificial neurons 310 in the various layers may be tailored to specific requirements of an application. Within a given layer such as the first layer 308, the second layer 314, or the third layer 318 of the ANN 300, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" artificial neurons of a next layer. Artificial neurons in such a layer may be activated by or be responsive to parameters such as the previously described weights and biases of the ANN 300. The weights and biases of the ANN 300 may be adjusted during a training process or during operation of the ANN 300. The weights of the various artificial neurons may control a strength of connections between layers or artificial neurons, while the biases may control a direction of connections between the layers or artificial neurons. An activation function may select or determine whether an artificial neuron transmits its output to the next layer or not in response to its received data.

Different activation functions may be used to model different types of non-linear relationships. By introducing non-linearity into an ML model, an activation function allows the configuration for the ML model to change in response to identifying or detecting complex patterns and relationships in the input data 306. Some non-exhaustive example activation functions include a sigmoid based activation function, a hyperbolic tangent (tanh) based activation function, a convolutional activation function, up-sampling, pooling, and a rectified linear unit (ReLU) based activation function.

Training of an ML model, such as ANN 300, may be conducted using training data. Training data may include one or more datasets which ANN 300 may use to identify patterns or relationships. Training data may represent various types of information, including written, visual, audio, environmental context, operational properties, etc. During training, the parameters (such as the weights and biases) of artificial neurons 310 may be changed, such as to minimize or otherwise reduce a loss function or a cost function. A training process may be repeated multiple times to fine-tune ANN 300 with each iteration.

Various ANN model structures are available for consideration For example, in a feedforward ANN structure, each artificial neuron 310 in layer 314 receives information from the previous layer (such as, one or more artificial neurons 310 in layer 308) and produces information for the next layer (such as, one or more artificial neurons 310 in layer 318). In a convolutional ANN structure, some layers may be organized into filters that extract features from data, such as the training data or the input data. In a recurrent ANN structure, some layers may have connections that allow for processing of data across time, such as for processing information having a temporal structure, such as time series data forecasting. In an autoencoder ANN structure, compact representations of data may be processed and the model trained to predict or potentially reconstruct original data from a reduced set of features. An autoencoder ANN structure may be useful for tasks related to dimensionality reduction and data compression.

The ANN 300 or other ML models may be implemented in various types of processing circuits along with memory and applicable instructions therein. For example, general-purpose hardware circuits, such as, such as one or more central processing units (CPUs), one or more graphics processing units (GPUs), or suitable combinations thereof, may be employed to implement a model. In some implementations, one or more tensor processing units (TPUs), neural processing units (NPUs), or other special-purpose processors, field-programmable gate arrays (FPGAs), application-specific integrated circuits (ASICs), or the like also may be employed. In some implementations, the ML model may be implemented by a NPU or a TPU embedded in a system on chip (SoC) along with other components, such as one or more CPUs, GPUs, etc. A SoC includes several components manufactured on a shared semiconductor substrate. The NPU or TPU may be controlled by the one or more CPUs by configuring the ML model implemented by the NPU or TPU with weights and biases, providing certain training data to the ML model to configure the ML model, or providing input data to the ML model to obtain related inferences. The one or more CPUs also may receive the inferences and be configured to perform certain actions based on the inferences produced by the ML model. The actions performed by the one or more CPUs may include sending commands to other components of the SoC or components external to the SoC to perform certain actions. For example, the CPU may send commands to a RF transceiver based on the outputs or inferences obtained from an ML model to cause the RF transceiver to operate on a wireless network in accordance with the ML model.

In example aspects, an ML model may be trained prior to, or at some point following, operation of the ML model, such the ANN 300, on input data. When training the ML model, information in the form of applicable training data may be gathered or otherwise created for use in training an ANN accordingly. For example, training data may be gathered or otherwise created regarding information associated with received/transmitted signal strengths, interference, and resource usage data, as well as any other relevant data that might be useful for training a model to address one or more problems or issues in a communication system. In certain instances, all or part of the training data may originate in an AP 102 or other device in a wireless communication system, or one or more STAs 104, or aggregated from multiple sources (such as one or more APs 102 and one or more STAs 104, the Internet, or the like). In another example, training data may be generated or collected online, offline, or both online and offline by a UE, network entity, or other device (s), and all or part of such training data may be transferred or shared (in real or near-real time), such as through store and forward functions or the like.

Once an ANN has been configured by setting parameters, including weights and biases, from training data, the ANN's performance may be evaluated. In some scenarios, evaluation/verification tests may use a validation dataset, which may include data not in the training data, to compare the model's performance to baseline or other benchmark information. The ANN configuration may be further refined, for example, by changing its architecture, re-training it on the data, or using different optimization techniques, etc.

In some implementations, one or more devices or services may support processes relating to a ML model's usage, maintenance, activation, reporting, or the like. In certain instances, all or part of a dataset or model may be shared across multiple devices, to provide or otherwise augment or improve processing. In some examples, signaling mechanisms may be utilized at various nodes of wireless network to signal the capabilities for performing specific functions related to ML model, support for specific ML models, capabilities for gathering, creating, transmitting training data, or other ML related capabilities. ML models in wireless communication systems may, for example, be employed to support decisions or improve performance relating to wireless resource allocation or selection, wireless channel condition estimation, interference mitigation, beam management, positioning accuracy, energy savings, or modulation or coding schemes, etc. In some implementations, model deployment may occur jointly or separately at various network levels, such as, an AP 102, a STA 104, or the like.

In some examples, when a wireless channel (such as a channel selected by an AP 102) between an AP 102 and one or more other devices (such as STAs 104) becomes congested, the AP 102 may switch to a less congested channel (such as a cleaner channel) to reduce (such as mitigate or avoid) throughput degradation and latency degradation associated with interference. For instance, the AP 102 may perform one or more channel selection operations including performing an off-channel scan (such as a Wi-Fi scan). As part of the off-channel scan, the AP 102 may perform a signal detection operation (such as Wi-Fi signal detection) on one or more channels that are not currently selected by the AP 102 (that is, the AP 102 may go off-channel) for performing communications (such as transmitting and/or receiving communication signals). The AP 102 may perform the signal detection in accordance with a configured duration (such as a dwell time) during which the AP 102 actively senses or measures signals on the one or more channels, which may be based on a band type, a scan type, or both. In some examples, the AP 102 may use an additional radio (such as a scan radio) to scan other channels in parallel with performing communications on a selected channel (such as without impacting connected STAs 104 or other clients on one or more main radio(s) of the AP 102). However, at least some APs 102 may not support such an additional radio. In some examples, an AP 102, or other device, may perform a channel selection operation as part of a boot-up procedure or based on a channel quality degrading beyond a threshold, among other examples.

In some examples, an AP 102 may use one or more spectral scan techniques to obtain (such as collect, capture, identify) frequency characteristics associated with a wireless channel. For instance, an AP 102 may perform an off-channel Wi-Fi scan and a spectral scan (such as a regular spectral scan) to obtain an FFT spectral image of the channel. In some examples, the AP 102 may support an agile spectral scan in which the AP 102 may use a single chain (such as of multiple chains at the AP 102) for obtaining an FFT spectral image of other channels (such as when a quantity of communication traffic is relatively low). The agile scan may provide an alternative technique for channel scanning and may reduce impact to one or more connected STAs 104 or other clients (such as in scenarios where communications with other devices are maintained during channel scanning). Accordingly, in some examples, the results of a spectral scan may be processed by the AP 102 (or other device that performs the spectral scan) to assess the presence of a Wi-Fi signal or other types of wireless signals (such as using specific heuristics to identify the various types of wireless signals). For instance, an AP 102 may determine whether to select a wireless channel or to not select a wireless channel based on the type of interference identified on the wireless channel, or may schedule communications with one or more STAs based on the identified interference.

In some examples, the AP 102 may use the spectral scan to identify a wireless signal based on pattern matching of its frequency-time characteristics (such as a spectrogram). The spectral scan may include recording an FFT of the channel at specific times. In some examples, an AP 102 may use a regular spectral scan for home-channel interference assessment (such as assessment of a currently selected channel). Additionally, or alternatively, The AP 102 may use an agile spectral scan for off-channel interference assessment by allowing one chain (such as an RF chain) to perform an FFT operation while one or more remaining chains are used for Tx/Rx (such as to minimize impact to throughput, latency, and CPU utilization). In some examples, based on spectrogram analysis and pattern matching, the AP 102 may use such scans to classify a signal as one of a WLAN (or OFDM) signal, a CW signal, an FHSS signal, a Bluetooth signal, an MWO signal, an AWGN signal, or some other signal. In some examples, an output of a spectral scan may include various information including an FFT output (such as an amplitude value for each frequency bin), a timestamp, an RSSI value, and other information.

In some examples, the AP 102 may utilize one or more sets of rules (such as heuristics, a set of "if-then" rules) to classify various types of interference detected in a wireless communication channel. Some interference classification techniques may use a relatively high quantity of input data (such as FFT samples, 2500 samples or more) to achieve a target accuracy of interference classification, which may increase processing time. As an illustrative example, if an AP 102 utilizes such techniques to detect a first type of interference (such as Wi-Fi interference or MWO interference), the AP 102 may use a first quantity of input samples (such as 2,500 or more input samples, which may use a duration of 0.56 seconds). Similarly, to detect a second type of interference (such as CW interference), the AP 102 may use a second quantity of input samples (such as 500 or more input samples, which may use a duration of 0.11 seconds), and to detect a third type of interference (such as FHSS interference), the AP 102 may use a third quantity of input samples (such as 23,000 or more input samples, which may use a duration of 5.15 seconds), and so on.

Accordingly, the relatively large input may increase a processing duration associated with identifying the interference, thus increasing processing overhead associated with channel selection procedures. Additionally, techniques that utilize specific rule-based classification heuristics may be associated with a lack of scalability for newly introduced types of interference signals. That is, a new set of rules may be developed for each new type of interference (such as mobile terrestrial networks, Bluetooth interference in 5G/6G frequency bands, thread technology, and other examples)

introduced in a wireless communication environment, which may present challenges for maintaining and updating devices of a wireless communication network (such as logistics and time-to-market issues).

In accordance with one or more techniques described herein, an AP 102 (or a STA 104, or some other device) may utilize the ANN 300 (or some other ML/AI technique) to perform one or more interference evaluation operations (such as interference classification, OBSS interference evaluation). That is, the AP 102 may use an ANN 300 that has been trained to output a predicted class of interference (such as based on an input of a set of frequency domain samples). In some examples, the AP 102 may use the ANN 300 in conjunction with various spectral scan operations (such as agile spectral scan and/or regular spectral scan), which may support relatively faster, more accurate, and scalable interference classification techniques. For example, the ANN 300 may receive data 302 that is associated with a reduced quantity of input samples (such as reduced quantity FFT samples relative to other interference classification techniques) to classify interference in a wireless channel.

In some examples, the AP 102 may utilize an ANN 300 that implements a multi class/multi-label neural network structure, which may support classification of multiple interference sources in parallel (such as predicting multiple types of interference simultaneously). For example, the ANN 300 may output one or more predicted classes of interference based on a single set of input samples (such as a single FFT image). Additionally, the AP 102 may use a same ANN 300 structure (with updated model parameters) to classify various types of interference, including new sources of interference (such as based on offline training with the new sources, via cloud-based updates), supporting relatively faster commercialization.

In some examples, the AP 102 may utilize the predicted class of interference output by the ANN 300 (such as ML-based interference classification) to perform various operations or procedures. In some examples, the AP 102 may utilize ML-based interference classification to classify interference on a home channel, one or more non-home channels (such as off-channel(s)), or both (such as part of an RF interference classification utility. That is, the AP 102 may use the ANN 300 to predict (such as detect, identify, classify) various classes of interference such as: a WLAN interference, CW interference, FHSS interference, Bluetooth interference, Microwave interference (such as MWO interference), AWGN interference, an idle channel (such as a lack of interference), ZigBee signal interference, Thread signal interference (or some other low-power IoT mesh network), a proprietary protocol communication signal (such as from a wireless movie production device, baby monitor, or the like), or other interference classes associated with a wireless channel or subchannel (such as any interference pattern the ANN 300 is trained on).

Additionally, or alternatively, the AP 102 may utilize ML-based interference classification to perform channel selection operations and/or frequency planning operations. For example, the AP 102 may use a predicted interference to perform an initial channel selection, a channel switch operation, a background scan operation (such as automatic channel selection (ACS), dynamic channel selection (DCS), or channel busy scan (CBS)) based on a predicted (or estimated) interference presence and/or interference power estimation on one or more neighboring channels. In another example, the AP 102 may use the interference classification predicted by the ANN 300 for a 6G passive scan (such as a fast 6G scan) for a soft access point (SAP) (such as a mobile device operating as an AP 102 or a hotspot), which may not support automatic frequency control (AFC). In some examples, the predicted class of interference may support frequency planning operations such as frequency reuse (such as for enterprise APs).

Additionally, or alternatively, the AP 102 may utilize ML-based interference classification to perform network anomaly detection operations. For example, an AP 102 may be configured to output information (such as an interference heatmap) associated with the predicted class of interference to a user (such as a network manager or household user). Accordingly, the use may be able to accurately identify network issues based on the predicted interference classification output by the ANN 300. Additionally, or alternatively, the AP 102 may utilize ML-based interference classification to perform one or more scheduling operations such as dynamic puncturing, bandwidth management, and rate adaptation, among other examples. For example, the AP 102 to puncture one or more frequency resources (such as one or more sub-bands) based on a predicted class of interference for each sub-band. In another example, the AP 102 may be enabled to improve interference filtering logic in rate adaptation by utilizing the ANN 300 in accordance with techniques herein.

In some examples, the data 302 may include one or more samples associated with an output of one or more FFT operations (such as an FFT spectral image) and other parameters. For example, the data 302 input to the ANN 300 may be an FFT spectral image, which may include a set of FFT frequency bins (such as in accordance with a parameters associated with the FFT operations, 64 frequency bins for a 64-point FFT operation) across a quantity of time domain samples (such as over m time samples, which may construct a three-dimensional set of data including a time dimension, a frequency dimension, and an amplitude dimension). Additionally, or alternatively, the data 302 may include an RSSI value (such as an RSSI associated with the input FFT samples), which may be used as a filter for a validity of the FFT output. Additionally, or alternatively, the input may include a load metric of the wireless network associated with the AP 102 (such as an in BSS load metric that measures a quantity or level of traffic in the network). Additionally, or alternatively, the input may include a frequency band associated with the AP 102 (such as 2.4 GHz, 5 GHz, 6 GHz, a band associated with communications performed by the AP 102). Additionally, or alternatively, the input may include an operating frequency associated with the AP 102 (such as a frequency value or range within the frequency band associated with the AP 102). Additionally, or alternatively, the input may include a bandwidth parameter associated with the AP 102 (such as 20 MHz, 40 MHz, 80 MHz, a bandwidth size parameter).

In some examples, the structure of the ANN 300 may include a structure 330 (a model such as a multi-class/multi-label convolutional NN), which may be an example of a convolutional neural network with multi-class output (such as based on a soft-max operation). For example, the structure 330 may include a layer 332 (such as an input layer), which may receive the input data 306. The data from the layer 332 may be provided to one or more layers 334 (such as one or more convolutional layers), which may provide the data to a layer 336 (such as an activation layer). The data from the layer 336 may be provided to the layer 338 (such as one or more pooling layers), which may be associated with down sampling the data. The data from layer 338 may be provided to one or more layers 340 (such as one or more fully connected layers). In some examples, each of the artificial neurons 310 at the layer 340 may be associated with a given interference class as described herein. The data of the layer 340 (such as data associated with each interference class) may be provided to a function 344 (such as a SoftMax function), and the function 344 may output one or more predicted classes of interference included in the output data 324 based on the data from the layer 340. In some examples, the output data 324 (and the output data 328) may be associated with one or more predicted interference classes. In some examples, a predicted class of interference may identify a types of signal that interferes with a wireless channel. For example, a predicted class may include a WLAN class, a CW class, an FHSS class, an MWO class, an AWGN class, an idle class, a ZigBee class, a Thread class, a proprietary protocol class (such as any proprietary communication protocol in 2.4 GHz, 5 GHz, or 6 GHz unlicensed bads), a peripheral device class (such as a wireless keyboard, wireless mouse, or other RF peripherals), an audio-visual (AV) class (such as interference from baby monitors, wireless speakers, wireless video devices), a radio control class (such as interference from radio-controlled drones or cars, garage door openers), a radar class, a power signal class, a Universal Serial Bus (USB) 3.0 class, or any other class of interference that the ANN 300 is trained on.

In some examples, after being output from the ANN 300, an AP 102 may estimate a duty cycle associated with the interference (such as part of one or more operations of a post-processor 326 or some other module). For example, the AP 102 may use (such as invoke or call) the ANN 300 multiple times in a sequential manner. After each iteration (such as after output data 324 is determined), a module outside the neural network may estimate the duty cycle of interference on a given channel (such as which may be used for calculating an interference heatmap), which the AP 102 may use for channel selection, calculating an interference heatmap, or other techniques described herein. In some examples, such a module may be an outer loop that utilizes (such as invokes or calls) the neural network in accordance with a given periodicity or a given spacing.

In some examples, the AP 102 may use the ANN 300 for classification of one or more subchannels (or sub-bands, per-subchannel interference classification). In such examples, the data 302 may be associated with one or more FFT frequency bins that are split into various subsets (such as 20 MHz chunks, a quantity of channels, which may each include a quantity of FFT bin samples, such as 64 bins) and across a quantity of time samples. That is, the data 302 may be associated with multiple channels (such as the input may have multiple dimensions), where each channel is associated with a given frequency sub-band. Accordingly, the ANN 300 may be configured to output one or more predicted classes of interference per sub-band, which may support channel selection operations, dynamic puncturing operations, generation of a sub-band heatmap (such as a per 20 MHz interference heatmap).

In some examples, the structure 330 (such as an architecture) may support a model associated with CNN with a two-dimensional convolution operation (such as in accordance with the one or more layers 334) and a pooling operation (such as in accordance with the layer 338), which may be followed by one or more fully connected layers (such as the one or more layers 340). In some examples, the two-dimensional convolution operation may include two convolution layers each with a 3×3 kernel, two full connected layers, and a SoftMax operation. In some examples, a flow for such a model may include two or more iterations of a two-dimensional convolution operation, a first rectified linear unit (ReLU) operation, and one or more pooling operations (such as MaxPool2D), followed by two or more iterations of a linear operation and a second ReLU operation, followed by a second linear operation and a SoftMax operation. Additionally, or alternatively, the ANN 300 may support a model associated with a multi-layer perceptron (MLP) fully connected neural network. Such a model may be associated with a fully connected input layer with ReLU activation, two or more hidden layers with ReLU activation, and an output layer with a SoftMax operation. A flow for this model may include three or more iterations of a linear operation and a ReLU operation, followed by a linear operation and a SoftMax operation.

In some examples, an AP 102 may utilize the one or more predicted classes of interference to perform interference evaluation for one or more wireless channels (such as evaluations that include channels outside a BSS). For example, the AP 102 may use agile or regular spectral scan results and RSSI measurements to assess a presence, type, or strength (such as power level) of interference on a selected channel and/or one or more adjacent channels. In some examples, the AP 102 may use such information to generate (such as build, output) a heatmap that indicates channel usability. That is, the AP 102 may track metrics such as interference type, interference strength, and a duration (or timestamp) of the interference over time to create a heatmap (such as a "day-of-use" heatmap) for each wireless channel or sub-channel. The AP 102 may use such a heatmap (such as an interference heat map) for channel selection and/or channel frequency planning (such as long-term frequency planning). The heatmap may capture the presence of interference on a given channel and also may capture a holistic view of channel quality based on various interference signals (such as over an extended period of time). Such techniques may be support by dedicated scan radios (such as Wi-Fi scan radios).

Thus, by utilizing an ANN 300 in accordance with techniques described herein, an AP 102 (or some other device that uses the ANN 300) may leverage such interference classification and channel interference evaluation techniques for infra AP channel selection, channel frequency planning, soft AP channel selection, channel changes in the presence of interference, network anomaly identification (such as Wi-Fi network problem, a tool for network managers/users to get a snapshot of in BSS and outside BSS interference), and adaptation of AP scheduler parameters based on interference, among other examples. In some examples, the adaptation of AP scheduler parameters may include dynamic puncturing and bandwidth management based on per-sub-band interference detection, rate adaptation based on interference information, or both.

In some examples, by predicting channel interference using the ANN 300, an AP may support faster channel selection operations. For example, the ANN 300 may support accurate predictions with relatively fewer input samples, thus reducing processing time associated with assessing channel quality. Moreover, by using the ANN 300 to generate an interference heatmap, a user may be able to more quickly identify and resolve anomalies in the network performance, resulting in relatively higher communication quality and network reliability. Additionally, the ANN 300 may be trained to identify various types of interference, which may support compatibility with next-generation techniques for interference classification and operations associated therewith.

Figure 4:
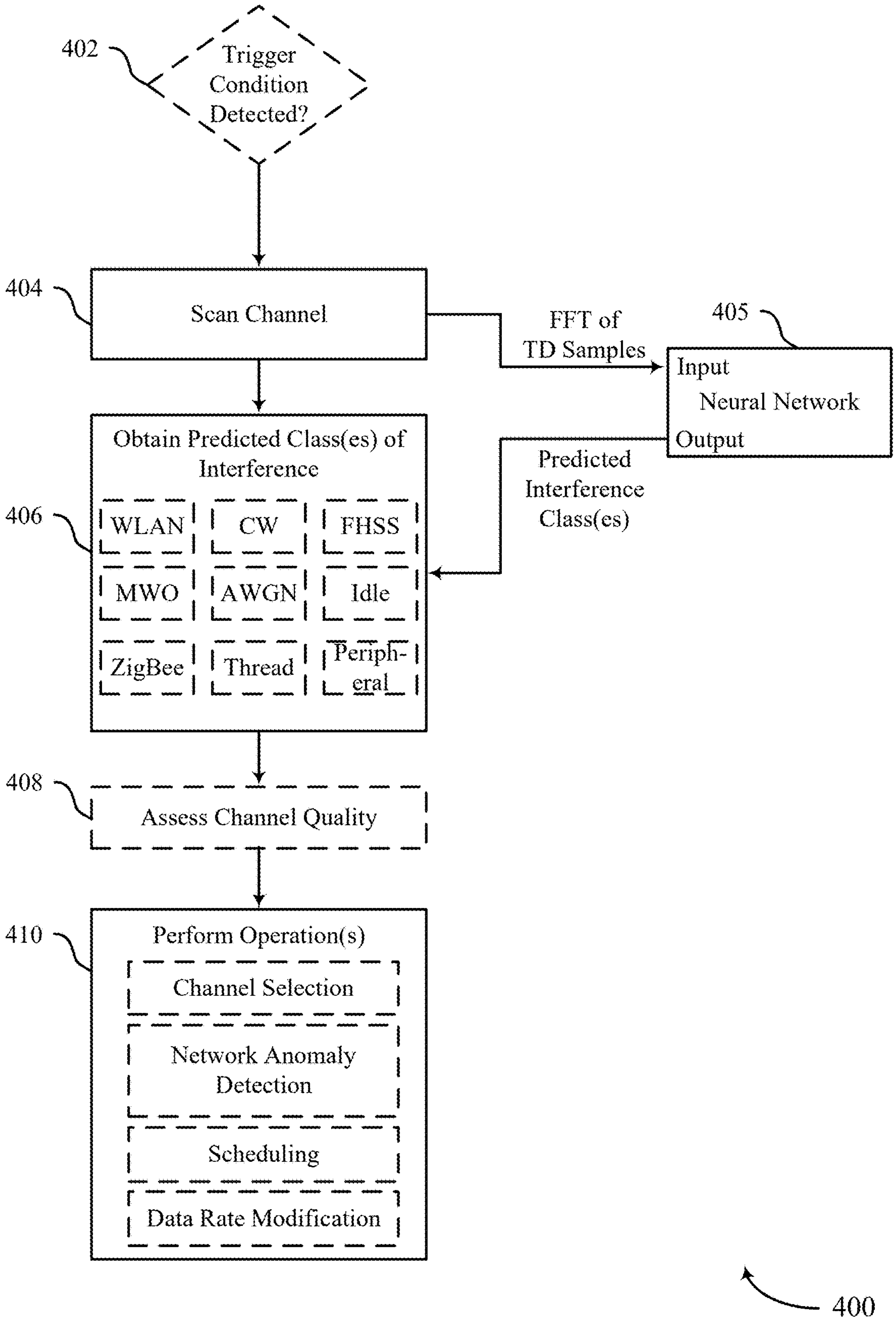
FIG. 4 shows an example of a flowchart that supports AP spectral scan using NNs.

FIG. 4 shows an example of a flowchart 400 that supports AP spectral scan using NNs. The flowchart 400 may implement or be implemented to realize aspects of the wireless communication network 100, the PPDU 200, and the ANN 300. For example, the flowchart 400 may illustrate a procedure supported by an AP 102 (or a STA 104) that implements the ANN 300. Alternative examples of the following may be implemented. Some steps are performed in a different order than described or are not performed at all. In some implementations, steps may include additional features not mentioned below, or further steps may be added.

At 402, an AP 102 may detect one or more trigger conditions (such as a spectral scan trigger condition). In some examples, the one or more trigger conditions may include an RSSI of a wireless channel satisfying a first threshold, a channel congestion metric of the wireless channel satisfying a second threshold, a packet error rate (PER) of the wireless channel satisfying third threshold, a timer duration satisfying fourth threshold, or any combination thereof. That is, the AP 102 may (continuously) monitor a quality of current channel as a function of RSSI, a channel congestion level, a channel access time, a PER, a quantity of transmission retries, and other metrics. When one or more of the channel quality thresholds are satisfied, the AP 102 may trigger a spectral scan. In some examples, scanning the wireless channel may be in accordance with detecting the one or more trigger conditions. In some examples, the performance of a scan may be timer-based. That is, the AP 102 may perform a periodic background DCS in accordance with a periodicity (such as a configured periodicity).

At 404, the AP 102 may scan one or more wireless channels to obtain a set of time domain samples. For example, the AP 102 may trigger a scan (such as an agile spectral scan) on one or more neighboring channels (such as non-overlapping channels with a current home channel). Additionally, or alternatively, the AP 102 may trigger a scan (such as a regular spectral scan) on a home channel. In some examples, the AP 102 may perform one or more FFT operations on a set of samples obtained during the scan. An output of the FFT operations (such as an FFT image) may include an amplitude value associated with a first quantity of frequency samples for a second quantity of time samples. For example, for each time domain sample of a set of multiple time domain samples, the FFT output may include multiple frequency domain samples (such frequency bins) that are each associated with an amplitude value.

At 406, the AP 102 may obtain one or more predicted classes of interference associated with one or more wireless channels including the wireless channel. For example, the AP 102 may (such as using an spectral scan engine) collects a quantity of time samples that are sent to a neural network 405 (such as the ANN 300, a ML inferencing engine in a host). In some examples, the AP 102 may input an output of one or more FFT operations performed on a set of time domain samples to a neural network 405 that is trained to output one or more predicted classes of interference associated with one or more wireless channels including the wireless channel. That is, the one or more predicted classes of interference may be output by the neural network 405. In some examples, the AP 102 may input a plurality of sample sets which may be output by the FFT operations. In such examples, each sample set of a plurality of sample sets may correspond to a sub-channel of the wireless channel. In some examples, performing a wireless channel selection operation, a network anomaly detection operation, a scheduling operation, a data rate modification operation, or other operation may be in accordance with a plurality of predicted classes of interference that are output by the neural network in accordance with the plurality of sample sets.

In some examples, the AP 102 may input one or more RSSI values, one or more load metrics (such as BSS load metrics), an operating frequency, a frequency band, a bandwidth parameter, or any combination thereof to the neural network along with the output of the FFT operation. In some examples, the one or more predicted classes of interference output by the neural network may include a WLAN class, a CW class, a FHSS class, a MWO class, an AWGN class, an idle class, a ZigBee class, a Thread class, a peripheral device class, or any combination thereof.

At 408, the AP 102 may determine one or more channel quality metrics in accordance with the one or more predicted interference classes. For example, the AP 102 may compare one or more channel quality metrics (such as interference metrics) associated with one or more neighbor channels with one or more channel quality metrics of a current channel (such as a home channel). Accordingly, an AP 102 may determine whether to select (such as switch to) a different channel and determine which channel to select.

At 410, the AP 102 may perform, in accordance with the one or more predicted classes of interference, one or more of: a wireless channel selection operation, a network anomaly detection operation, a scheduling operation associated with communications by the AP on the wireless channel, or a data rate modification operation. In some examples, the AP 102 may estimate a duty cycle associated with interference of the wireless channel, and performing one or more of the wireless channel selection operation, the network anomaly detection operation, the scheduling operation, or the data rate modification operation is in accordance with the duty cycle. In some examples, the AP 102 may perform the various operations in accordance with various inputs to the NN, including the FFT data, the one or more RSSI values, the one or more load metrics, the operating frequency, the frequency band, the bandwidth parameter, or any combination thereof In some examples, performing the wireless channel selection operation may include selecting a wireless channel to use for communications with one or more STAs in accordance with the one or more predicted classes of interference of the wireless channel. In some examples, performing the scheduling operation may include puncturing a respective sub-channel of the wireless channel in accordance with the one or more predicted classes of interference, with an interference power level associated with the one or more predicted classes of interference, with a duration associated with the one or more predicted classes of interference, one or more puncturing pattern rules, or any combination thereof. In some examples, the one or more predicted classes of interference may be associated with the respective sub-channel.

In some examples, puncturing the respective sub-channel of the wireless channel may be in accordance with one or more puncturing pattern rules (such as puncturing pattern parameters). The puncturing pattern rules may include a minimum bandwidth of a puncture, a location of a puncture (such as a puncturing pattern), or both. In some examples, the rules for puncturing patterns may be preconfigured at one or more wireless devices or may be indicated via a set of candidate puncturing patterns. The AP may determine the allowed puncturing patterns (such as the candidate puncturing patterns) and may select a puncturing pattern that aligns with (such as is close to, is within a threshold of, or matches) at least one of the allowed puncturing patterns, or satisfies the puncturing pattern rules, or both, when scheduling communications. In an example, if a bandwidth for communication is 320 MHz and interference is detected on a 20

MHz sub-band out of the 320 MHz, the AP may not schedule 320-20 MHz (such as 320 MHz with a 20 MHz puncture excluded) since puncturing 20 MHz out of the 320 MHz may be disallowed (such as may not satisfy a minimum bandwidth of a puncture). The minimum bandwidth of a puncture may be 40 MHz, and the AP may schedule 320-40 MHz or 320-80 MHz, and the punctured bandwidth may include the 20 MHz of detected interference.

In some examples, performing the network anomaly detection operation may include outputting an indication (such as generating an interference heatmap) including the one or more predicted classes of interference of the wireless channel, one or more interference power levels associated with each of the one or more predicted classes of interference, or both. In some examples, the indication may include a plurality of predicted classes of interference of the wireless channel including the one or more predicted classes of interference and a plurality of interference power levels including the one or more interference power levels. In some examples, each predicted class of the plurality of predicted classes of interference may be associated with a respective duration (or a timestamp). In some examples, performing the scheduling operation may include modifying a rate of communicating data in accordance with the one or more predicted classes of interference of the wireless channel, an interference power level associated with the one or more predicted classes of interference, a duration associated with the one or more predicted classes of interference, or any combination thereof.

In some examples, by performing channel selection in accordance with obtaining a predicted class of interference, the described techniques can be used to reduce processing overhead associated with channel selection procedures, resulting in reduced latency. Moreover, by performing network anomaly detection in accordance with the predicted classes, the described techniques can be used to reduce network downtime, resulting in increased reliability and improved user experience. Additionally, by performing scheduling operations using the predicted classes of interference, an AP 102 may more efficiently schedule communications with one or more STAs, thus increasing data throughput and improving communication reliability.

Figure 5:
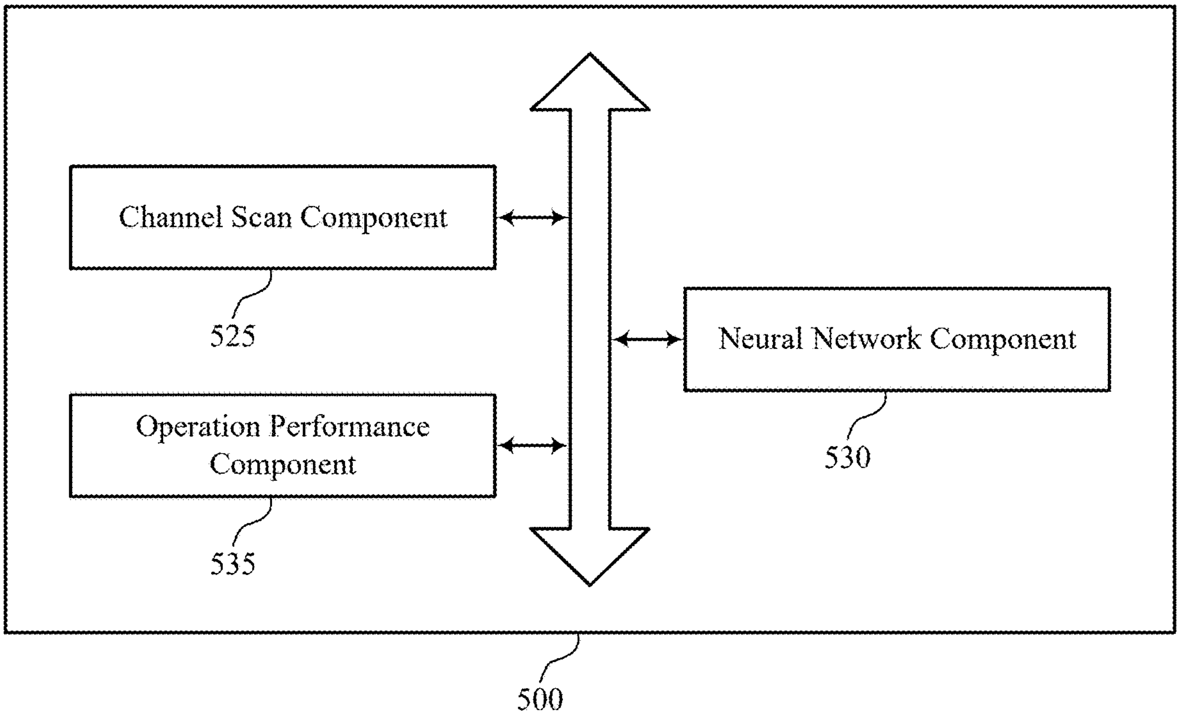
FIG. 5 shows a block diagram of an example wireless communication device that supports AP spectral scan using NNs.

FIG. 5 shows a block diagram of an example wireless communication device 500 that supports AP spectral scan using neural networks. In some examples, the wireless communication device 500 is configured to perform the processes 600 and 700 described with reference to FIGS. 6 and 7, respectively. The wireless communication device 500 may include one or more chips, SoCs, chipsets, packages, components or devices that individually or collectively constitute or include a processing system. The processing system may interface with other components of the wireless communication device 500, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 500 may transmit the information output from the chip. In such an example, the second interface may refer to an interface between the processing system of the chip and a reception component, such that the wireless communication device 500 may receive information that is passed to the processing system. In some such examples, the first interface also may obtain information, such as from the transmission component, and the second interface also may output information, such as to the reception component.

The processing system of the wireless communication device 500 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 500 can be configurable or configured for use in an AP, such as the AP 102 described with reference to FIG. 1. In some other examples, the wireless communication device 500 can be an AP that includes such a processing system and other components including multiple antennas. The wireless communication device 500 is capable of transmitting and receiving wireless communications in the form of, for example, wireless packets. For example, the wireless communication device 500 can be configurable or configured to transmit and receive packets in the form of physical layer PPDUs and MPDUs conforming to one or more of the IEEE 802.11 family of wireless communication protocol standards. In some other examples, the wireless communication device 500 can be configurable or configured to transmit and receive signals and communications conforming to one or more 3GPP specifications including those for 5G NR or 6G.

In some examples, the wireless communication device 500 also includes or can be coupled with one or more application processors which may be further coupled with one or more other memories. In some examples, the wireless communication device 500 further includes at least one external network interface coupled with the processing system that enables communication with a core network or backhaul network that enables the wireless communication device 500 to gain access to external networks including the Internet.

The wireless communication device 500 includes a channel scan component 525, a neural network component 530, and an operation performance component 535. Portions of one or more of the channel scan component 525, the neural network component 530, and the operation performance component 535 may be implemented at least in part in hardware or firmware. For example, one or more of the channel scan component 525, the neural network component 530, and the operation performance component 535 may be implemented at least in part by at least a processor or a modem. In some examples, portions of one or more of the channel scan component 525, the neural network component 530, and the operation performance component 535 may be implemented at least in part by a processor and software in the form of processor-executable code stored in memory.

The wireless communication device 500 may support wireless communications in accordance with examples as disclosed herein. The channel scan component 525 is configurable or configured to scan a wireless channel to obtain a set of time domain samples. The neural network component 530 is configurable or configured to obtain one or more predicted classes of interference associated with one or more wireless channels including the wireless channel. The operation performance component 535 is configurable or configured to perform, in accordance with the one or more predicted classes of interference, one or more of: a wireless channel selection operation, a network anomaly detection operation, a scheduling operation associated with communications by the AP on the wireless channel, or a data rate modification operation.

In some examples, to support obtaining the one or more predicted classes of interference, the neural network component 530 is configurable or configured to input an output of a FFT operation performed on the set of time domain samples to a neural network that is trained to output one or more predicted classes of interference associated with one or more wireless channels including the wireless channel, where the one or more predicted classes of interference are output by the neural network.

In some examples, to support inputting the output of the FFT operation, the neural network component 530 is configurable or configured to input a set of multiple sample sets associated with the output of the FFT operation, where each sample set of the set of multiple sample sets corresponds to a sub channel of the wireless channel, and where performing the wireless channel selection operation, the network anomaly detection operation, the scheduling operation, or the data rate modification is in accordance with a set of multiple predicted classes of interference that are output by the neural network in accordance with inputting the set of multiple sample sets.

In some examples, to support performing the scheduling operation, the operation performance component 535 is configurable or configured to puncture a respective sub-channel of the wireless channel in accordance with the one or more predicted classes of interference, an interference power level associated with the one or more predicted classes of interference, a duration associated with the one or more predicted classes of interference, one or more puncturing pattern rules, or any combination thereof, where the one or more predicted classes of interference are associated with the respective sub-channel and is included in the set of multiple predicted classes.

In some examples, the neural network component 530 is configurable or configured to input one or more RSSI values, one or more load metrics, an operating frequency, a frequency band, a bandwidth parameter, or any combination thereof to the neural network along with the output of the FFT operation, where the performing is in accordance with the one or more RSSI values, the one or more load metrics, the operating frequency, the frequency band, the bandwidth parameter, or any combination thereof.

In some examples, to support performing the wireless channel selection operation, the operation performance component 535 is configurable or configured to select the wireless channel to use for communications with one or more wireless stations (STAs) in accordance with the one or more predicted classes of interference of the wireless channel.

In some examples, to support performing the network anomaly detection operation, the operation performance component 535 is configurable or configured to output an indication including the one or more predicted classes of interference of the wireless channel, one or more interference power levels associated with each of the one or more predicted classes of interference, or both.

In some examples, the indication includes a set of multiple predicted classes of interference of the wireless channel including the one or more predicted classes of interference and a set of multiple interference power levels including the one or more interference power levels. In some examples, each predicted class of the set of multiple predicted classes of interference is associated with a respective duration.

In some examples, the operation performance component 535 is configurable or configured to estimate a duty cycle associated with interference of the wireless channel, where performing one or more of the wireless channel selection operation, the network anomaly detection operation, the scheduling operation, or the data rate modification operation is in accordance with the duty cycle.

In some examples, to support performing the data rate modification operation, the operation performance component 535 is configurable or configured to modify a rate of communicating data in accordance with the one or more predicted classes of interference of the wireless channel, an interference power level associated with the one or more predicted classes of interference, a duration associated with the one or more predicted classes of interference, or any combination thereof.

In some examples, the channel scan component 525 is configurable or configured to detect one or more trigger conditions, where scanning the wireless channel is in accordance with detecting the one or more trigger conditions, the one or more trigger conditions including a RSSI of the wireless channel satisfying a first threshold, a channel congestion metric of the wireless channel satisfying a second threshold, a packet error rate of the wireless channel satisfying third threshold, a timer duration satisfying fourth threshold, or any combination thereof.

In some examples, the one or more predicted classes of interference includes a WLAN class, a CW class, a FHSS class, a microwave oven class, an AWGN class, or an idle class, a ZigBee class, a Thread class, a peripheral device class, or any combination thereof.

Figure 6:
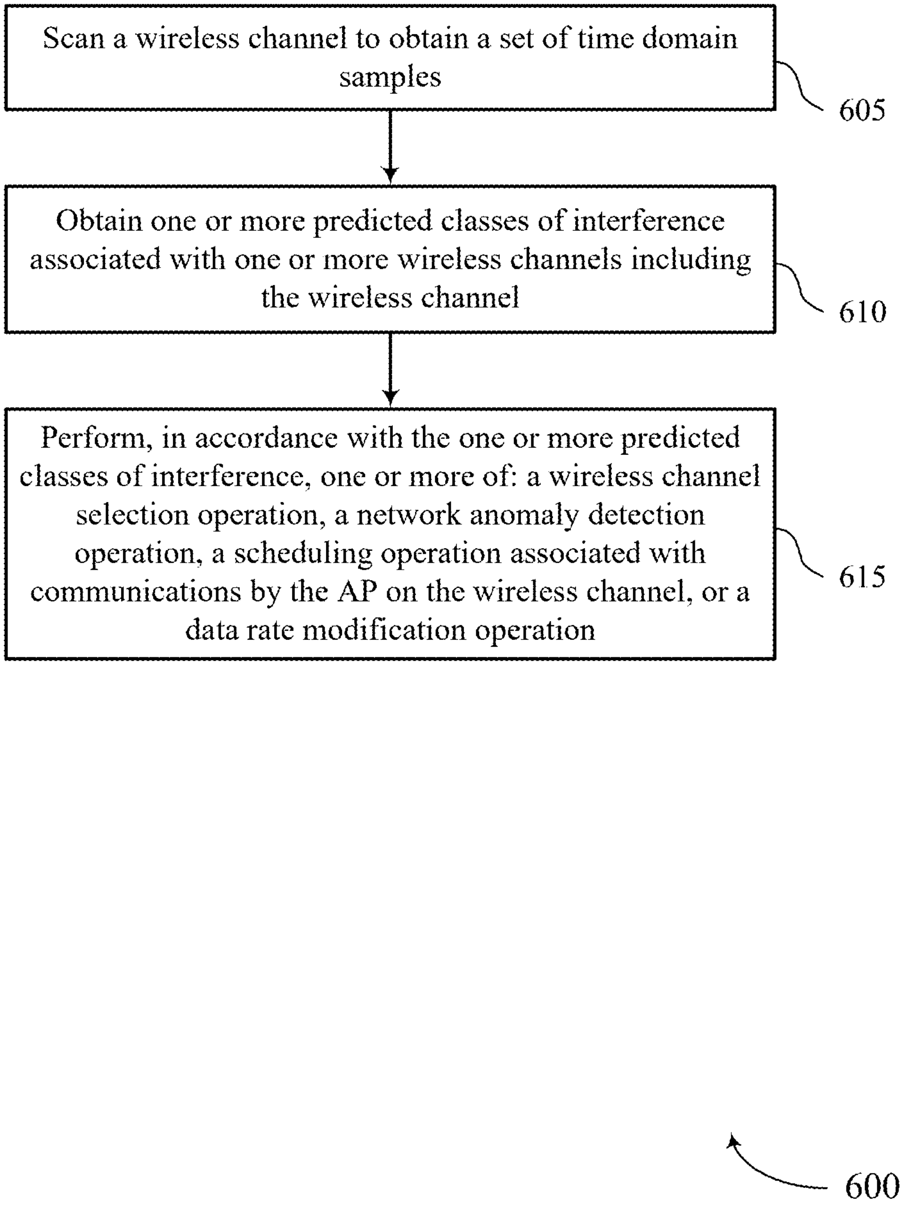
FIGS. 6 and 7 show flowcharts illustrating example processes performable by or at an AP that supports AP spectral scan using NNs.

FIG. 6 shows a flowchart illustrating an example process 600 performable by or at an AP that supports AP spectral scan using neural networks. The operations of the process 600 may be implemented by an AP or its components as described herein. For example, the process 600 may be performed by a wireless communication device, such as the wireless communication device 500 described with reference to FIG. 5, operating as or within a wireless AP. In some examples, the process 600 may be performed by a wireless AP, such as one of the APs 102 described with reference to FIG. 1.

In some examples, in 605, the AP may scan a wireless channel to obtain a set of time domain samples. The operations of 605 may be performed in accordance with examples as disclosed herein. In some implementations, aspects of the operations of 605 may be performed by a channel scan component 525 as described with reference to FIG. 5.

In some examples, in 610, the AP may obtain one or more predicted classes of interference associated with one or more wireless channels including the wireless channel. The operations of 610 may be performed in accordance with examples as disclosed herein. In some implementations, aspects of the operations of 610 may be performed by a neural network component 530 as described with reference to FIG. 5.

In some examples, in 615, the AP may perform, in accordance with the one or more predicted classes of interference, one or more of: a wireless channel selection operation, a network anomaly detection operation, a scheduling operation associated with communications by the AP on the wireless channel, or a data rate modification operation. The operations of 615 may be performed in accordance with examples as disclosed herein. In some implementations, aspects of the operations of 615 may be performed by an operation performance component 535 as described with reference to FIG. 5.

Figure 7:
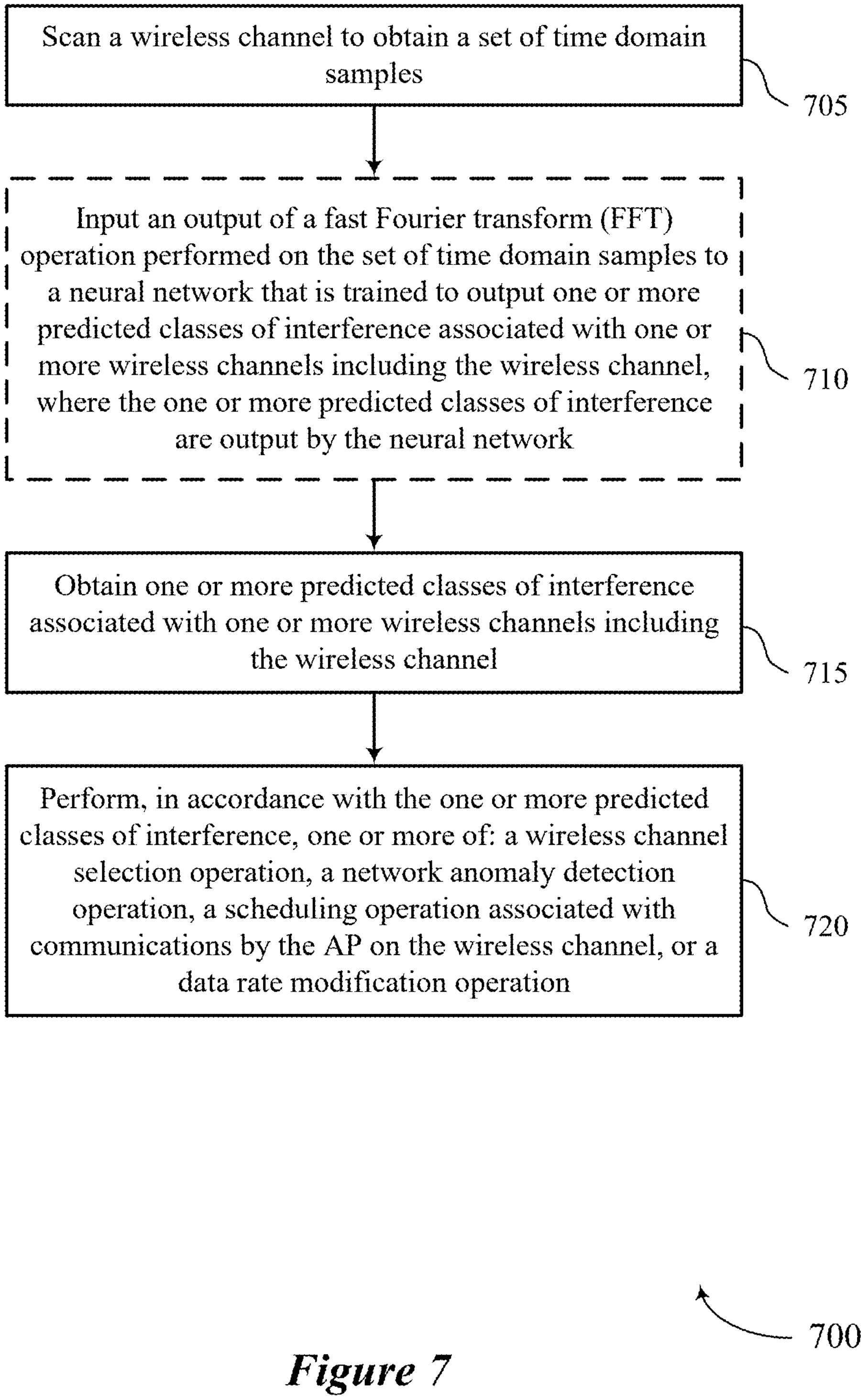

FIG. 7 shows a flowchart illustrating an example process 700 performable by or at an AP that supports AP spectral scan using neural networks. The operations of the process 700 may be implemented by an AP or its components as described herein. For example, the process 700 may be performed by a wireless communication device, such as the wireless communication device 500 described with reference to FIG. 5, operating as or within a wireless AP. In some examples, the process 700 may be performed by a wireless AP, such as one of the APs 102 described with reference to FIG. 1.

In some examples, in 705, the AP may scan a wireless channel to obtain a set of time domain samples. The operations of 705 may be performed in accordance with examples as disclosed herein. In some implementations, aspects of the operations of 705 may be performed by a channel scan component 525 as described with reference to FIG. 5.

In some examples, in 710, the AP may input an output of a FFT operation performed on the set of time domain samples to a neural network that is trained to output one or more predicted classes of interference associated with one or more wireless channels including the wireless channel, where the one or more predicted classes of interference are output by the neural network. The operations of 710 may be performed in accordance with examples as disclosed herein. In some implementations, aspects of the operations of 710 may be performed by a neural network component 530 as described with reference to FIG. 5.

In some examples, in 715, the AP may obtain one or more predicted classes of interference associated with one or more wireless channels including the wireless channel. The operations of 715 may be performed in accordance with examples as disclosed herein. In some implementations, aspects of the operations of 715 may be performed by a neural network component 530 as described with reference to FIG. 5.

In some examples, in 720, the AP may perform, in accordance with the one or more predicted classes of interference, one or more of: a wireless channel selection operation, a network anomaly detection operation, a scheduling operation associated with communications by the AP on the wireless channel, or a data rate modification operation. The operations of 720 may be performed in accordance with examples as disclosed herein. In some implementations, aspects of the operations of 720 may be performed by an operation performance component 535 as described with reference to FIG. 5.

Implementation examples are described in the following numbered clauses:

Aspect 1: An AP, including: a processing system that includes processor circuitry and memory circuitry that stores code, the processing system configured to cause the AP to: scan a wireless channel to obtain a set of time domain samples; obtain one or more predicted classes of interference associated with one or more wireless channels including the wireless channel; and perform, in accordance with the one or more predicted classes of interference, one or more of: a wireless channel selection operation, a network anomaly detection operation, a scheduling operation associated with communications by the AP on the wireless channel, or a data rate modification operation.

Aspect 2: The AP of aspect 1, where, to obtain the one or more predicted classes of interference, the processing system is configured to cause the AP to: input an output of a FFT operation performed on the set of time domain samples to a neural network that is trained to output one or more predicted classes of interference associated with one or more wireless channels including the wireless channel, where the one or more predicted classes of interference are output by the neural network.

Aspect 3: The AP of aspect 2, where, to input the output of the FFT operation, the processing system is configured to cause the AP to: input a set of multiple sample sets associated with the output of the FFT operation, where each sample set of the set of multiple sample sets corresponds to a sub channel of the wireless channel, and where performing the wireless channel selection operation, the network anomaly detection operation, or the scheduling operation is in accordance with a set of multiple predicted classes of interference that are output by the neural network in accordance with inputting the set of multiple sample sets.

Aspect 4: The AP of aspect 3, where, to perform the scheduling operation, the processing system is configured to cause the AP to: puncture a respective subchannel of the wireless channel in accordance with the one or more predicted classes of interference, an interference power level associated with the one or more predicted classes of interference, a duration associated with the one or more predicted classes of interference, one or more puncturing pattern rules, or any combination thereof, where the one or more predicted classes of interference are associated with the respective subchannel and is included in the set of multiple predicted classes.

Aspect 5: The AP of any of aspects 2 through 4, where the processing system is further configured to cause the AP to: input one or more RSSI values, one or more load metrics, an operating frequency, a frequency band, a bandwidth parameter, or any combination thereof to the neural network along with the output of the FFT operation, where the performing is in accordance with the one or more RSSI values, the one or more load metrics, the operating frequency, the frequency band, the bandwidth parameter, or any combination thereof.

Aspect 6: The AP of any of aspects 1 through 5, where, to perform the wireless channel selection operation, the processing system is configured to cause the AP to: select the wireless channel to use for communications with one or more wireless STAs in accordance with the one or more predicted classes of interference of the wireless channel.

Aspect 7: The AP of any of aspects 1 through 6, where, to perform the network anomaly detection operation, the processing system is configured to cause the AP to: output an indication including the one or more predicted classes of interference of the wireless channel, one or more interference power levels associated with each of the one or more predicted classes of interference, or both.

Aspect 8: The AP of aspect 7, where the indication includes a set of multiple predicted classes of interference of the wireless channel including the one or more predicted classes of interference and a set of multiple interference power levels including the one or more interference power levels, each predicted class of the set of multiple predicted classes of interference is associated with a respective duration.

Aspect 9: The AP of any of aspects 7 through 8, where the processing system is further configured to cause the AP to: estimate a duty cycle associated with interference of the wireless channel, where performing one or more of the wireless channel selection operation, the network anomaly detection operation, the scheduling operation, or the data rate modification operation is in accordance with the duty cycle.

Aspect 10: The AP of any of aspects 1 through 9, where, to perform the data rate modification operation, the processing system is configured to cause the AP to: modify a rate of communicating data in accordance with the one or more predicted classes of interference of the wireless channel, an interference power level associated with the one or more predicted classes of interference, a duration associated with the one or more predicted classes of interference, or any combination thereof.

Aspect 11: The AP of any of aspects 1 through 10, where the processing system is further configured to cause the AP to: detect one or more trigger conditions, where scanning the wireless channel is in accordance with detecting the one or more trigger conditions, the one or more trigger conditions including a RSSI of the wireless channel satisfying a first threshold, a channel congestion metric of the wireless channel satisfying a second threshold, a packet error rate of the wireless channel satisfying third threshold, a timer duration satisfying fourth threshold, or any combination thereof.

Aspect 12: The AP of any of aspects 1 through 11, where the one or more predicted classes of interference includes a WLAN class, a CW class, a FHSS class, a microwave oven class, an AWGN class, or an idle class, a ZigBee class, a Thread class, a peripheral device class, or any combination thereof.

Aspect 13: A method for wireless communications by an AP, including: scanning a wireless channel to obtain a set of time domain samples; obtaining one or more predicted classes of interference associated with one or more wireless channels including the wireless channel; and performing, in accordance with the one or more predicted classes of interference, one or more of: a wireless channel selection operation, a network anomaly detection operation, a scheduling operation associated with communications by the AP on the wireless channel, or a data rate modification operation.

Aspect 14: The method of aspect 13, where obtaining the one or more predicted classes of interference includes: inputting an output of a FFT operation performed on the set of time domain samples to a neural network that is trained to output one or more predicted classes of interference associated with one or more wireless channels including the wireless channel, where the one or more predicted classes of interference are output by the neural network.

Aspect 15: The method of aspect 14, where inputting the output of the FFT operation includes: inputting a set of multiple sample sets associated with the output of the FFT operation, where each sample set of the set of multiple sample sets corresponds to a sub channel of the wireless channel, and where performing the wireless channel selection operation, the network anomaly detection operation, or the scheduling operation is in accordance with a set of multiple predicted classes of interference that are output by the neural network in accordance with inputting the set of multiple sample sets.

Aspect 16: The method of aspect 15, where performing the scheduling operation includes: puncturing a respective sub-channel of the wireless channel in accordance with the one or more predicted classes of interference, an interference power level associated with the one or more predicted classes of interference, a duration associated with the one or more predicted classes of interference, one or more puncturing pattern rules, or any combination thereof, where the one or more predicted classes of interference are associated with the respective sub-channel and is included in the set of multiple predicted classes.

Aspect 17: The method of any of aspects 14 through 16, further including: inputting one or more RSSI values, one or more load metrics, an operating frequency, a frequency band, a bandwidth parameter, or any combination thereof to the neural network along with the output of the FFT operation, where the performing is in accordance with the one or more RSSI values, the one or more load metrics, the operating frequency, the frequency band, the bandwidth parameter, or any combination thereof.

Aspect 18: The method of any of aspects 13 through 17, where performing the wireless channel selection operation includes: selecting the wireless channel to use for communications with one or more wireless STAs in accordance with the one or more predicted classes of interference of the wireless channel.

Aspect 19: The method of any of aspects 13 through 18, where performing the network anomaly detection operation includes: outputting an indication including the one or more predicted classes of interference of the wireless channel, one or more interference power levels associated with each of the one or more predicted classes of interference, or both.

Aspect 20: The method of aspect 19, where the indication includes a set of multiple predicted classes of interference of the wireless channel including the one or more predicted classes of interference and a set of multiple interference power levels including the one or more interference power levels, each predicted class of the set of multiple predicted classes of interference is associated with a respective duration.

Aspect 21: The method of any of aspects 13 through 20, further including: estimating a duty cycle associated with interference of the wireless channel, where performing one or more of the wireless channel selection operation, the network anomaly detection operation, the scheduling operation, or the data rate modification operation is in accordance with the duty cycle.

Aspect 22: The method of any of aspects 13 through 21, where performing the data rate modification operation includes: modifying a rate of communicating data in accordance with the one or more predicted classes of interference of the wireless channel, an interference power level associated with the one or more predicted classes of interference, a duration associated with the one or more predicted classes of interference, or any combination thereof.

Aspect 23: The method of any of aspects 13 through 22, further including: detecting one or more trigger conditions, where scanning the wireless channel is in accordance with detecting the one or more trigger conditions, the one or more trigger conditions including a RSSI of the wireless channel satisfying a first threshold, a channel congestion metric of the wireless channel satisfying a second threshold, a packet error rate of the wireless channel satisfying third threshold, a timer duration satisfying fourth threshold, or any combination thereof.

Aspect 24: The method of any of aspects 13 through 23, where the one or more predicted classes of interference includes a WLAN class, a CW class, a FHSS class, a microwave oven class, an AWGN class, or an idle class, a ZigBee class, a Thread class, a peripheral device class, or any combination thereof.

Aspect 25: A non-transitory computer-readable medium storing code for wireless communications, the code including instructions executable by one or more processors to: scan a wireless channel to obtain a set of time domain samples; obtain one or more predicted classes of interference associated with one or more wireless channels including the wireless channel; and perform, in accordance with the one or more predicted classes of interference, one or more of: a wireless channel selection operation, a network anomaly detection operation, a scheduling operation associated with communications by the AP on the wireless channel, or a data rate modification operation.

Aspect 26: The non-transitory computer-readable medium of aspect 25, wherein the code to obtain the one or more predicted classes of interference are executable by the one or more processors to: input an output of a FFT operation performed on the set of time domain samples to a neural network that is trained to output one or more predicted classes of interference associated with one or more wireless channels including the wireless channel, where the one or more predicted classes of interference are output by the neural network.

Aspect 27: The non-transitory computer-readable medium of aspect 26, wherein the code to input the output of the FFT operation are executable by the one or more processors to: input a set of multiple sample sets associated with the output of the FFT operation, where each sample set of the set of multiple sample sets corresponds to a sub channel of the wireless channel, and where performing the wireless channel selection operation, the network anomaly detection operation, or the scheduling operation is in accordance with a set of multiple predicted classes of interference that are output by the neural network in accordance with inputting the set of multiple sample sets.

Aspect 28: The non-transitory computer-readable medium of aspect 27, wherein the code to perform the scheduling operation are executable by the one or more processors to: puncture a respective sub-channel of the wireless channel in accordance with the one or more predicted classes of interference, an interference power level associated with the one or more predicted classes of interference, a duration associated with the one or more predicted classes of interference, one or more puncturing pattern rules, or any combination thereof, where the one or more predicted classes of interference are associated with the respective sub-channel and is included in the set of multiple predicted classes.

Aspect 29: The non-transitory computer-readable medium of any of aspects 26 through 28, where the instructions are further executable by the one or more processors to: input one or more received RSSI values, one or more load metrics, an operating frequency, a frequency band, a bandwidth parameter, or any combination thereof to the neural network along with the output of the FFT operation, where the performing is in accordance with the one or more RSSI values, the one or more load metrics, the operating frequency, the frequency band, the bandwidth parameter, or any combination thereof.

Aspect 30: The non-transitory computer-readable medium of any of aspects 25 through 29, wherein the code to perform the wireless channel selection operation are executable by the one or more processors to: select the wireless channel to use for communications with one or more wireless STAs in accordance with the one or more predicted classes of interference of the wireless channel.

Aspect 31: The non-transitory computer-readable medium of any of aspects 25 through 30, wherein the code to perform the network anomaly detection operation are executable by the one or more processors to: output an indication including the one or more predicted classes of interference of the wireless channel, one or more interference power levels associated with each of the one or more predicted classes of interference, or both.

Aspect 32: The non-transitory computer-readable medium of aspect 31, where the indication includes a set of multiple predicted classes of interference of the wireless channel including the one or more predicted classes of interference and a set of multiple interference power levels including the one or more interference power levels, each predicted class of the set of multiple predicted classes of interference is associated with a respective duration.

Aspect 33: The non-transitory computer-readable medium of any of aspects 31 through 32, where the instructions are further executable by the one or more processors to: estimate a duty cycle associated with interference of the wireless channel performing one or more of the wireless channel selection operation, the network anomaly detection operation, the scheduling operation, or the data rate modification operation is in accordance with the duty cycle.

Aspect 34: The non-transitory computer-readable medium of any of aspects 25 through 33, wherein the code to perform the data rate modification operation are executable by the one or more processors to: modify a rate of communicating data in accordance with the one or more predicted classes of interference of the wireless channel, an interference power level associated with the one or more predicted classes of interference, a duration associated with the one or more predicted classes of interference, or any combination thereof.

Aspect 35: The non-transitory computer-readable medium of any of aspects 25 through 34, where the instructions are further executable by the one or more processors to: detect one or more trigger conditions, where scanning the wireless channel is in accordance with detecting the one or more trigger conditions, the one or more trigger conditions including a RSSI of the wireless channel satisfying a first threshold, a channel congestion metric of the wireless channel satisfying a second threshold, a packet error rate of the wireless channel satisfying third threshold, a timer duration satisfying fourth threshold, or any combination thereof.

Aspect 36: The non-transitory computer-readable medium of any of aspects 25 through 35, where the one or more predicted classes of interference includes a WLAN class, a CW class, a FHSS class, a microwave oven class, an AWGN class, or an idle class, a ZigBee class, a Thread class, a peripheral device class, or any combination thereof.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An access point (AP), comprising:

a processing system that includes processor circuitry and memory circuitry that stores code, the processing system configured to cause the AP to:

scan a wireless channel to obtain a set of time domain samples;

obtain one or more predicted classes of interference associated with one or more wireless channels including the wireless channel; and perform, in accordance with the one or more predicted classes of interference, one or more of: a wireless channel selection operation, a network anomaly detection operation, a scheduling operation associated with communications by the AP on the wireless channel, or a data rate modification operation.

2. The AP of claim 1, wherein, to obtain the one or more predicted classes of interference, the processing system is configured to cause the AP to:

input an output of a fast Fourier transform (FFT) operation performed on the set of time domain samples to a neural network that is trained to output one or more predicted classes of interference associated with one or more wireless channels including the wireless channel, wherein the one or more predicted classes of interference are output by the neural network.

3. The AP of claim 2, wherein, to input the output of the FFT operation, the processing system is configured to cause the AP to:

input a plurality of sample sets associated with the output of the FFT operation, wherein each sample set of the plurality of sample sets corresponds to a sub channel of the wireless channel, and wherein performing the wireless channel selection operation, the network anomaly detection operation, or the scheduling operation is in accordance with a plurality of predicted classes of interference that are output by the neural network in accordance with inputting the plurality of sample sets.

4. The AP of claim 3, wherein, to perform the scheduling operation, the processing system is configured to cause the AP to:

puncture a respective sub-channel of the wireless channel in accordance with the one or more predicted classes of interference, an interference power level associated with the one or more predicted classes of interference, a duration associated with the one or more predicted classes of interference, one or more puncturing pattern rules, or any combination thereof, wherein the one or more predicted classes of interference are associated with the respective sub-channel and is included in the plurality of predicted classes.

5. The AP of claim 2, wherein the processing system is further configured to cause the AP to:

input one or more received signal strength indicator (RSSI) values, one or more load metrics, an operating frequency, a frequency band, a bandwidth parameter, or any combination thereof to the neural network along with the output of the FFT operation, wherein the performing is in accordance with the one or more RSSI values, the one or more load metrics, the operating frequency, the frequency band, the bandwidth parameter, or any combination thereof.

6. The AP of claim 1, wherein, to perform the wireless channel selection operation, the processing system is configured to cause the AP to:

select the wireless channel to use for communications with one or more wireless stations (STAs) in accordance with the one or more predicted classes of interference of the wireless channel.

7. The AP of claim 1, wherein, to perform the network anomaly detection operation, the processing system is configured to cause the AP to:

output an indication comprising the one or more predicted classes of interference of the wireless channel, one or more interference power levels associated with each of the one or more predicted classes of interference, or both.

8. The AP of claim 7, wherein:

the indication includes a plurality of predicted classes of interference of the wireless channel including the one or more predicted classes of interference and a plurality of interference power levels including the one or more interference power levels, and each predicted class of the plurality of predicted classes of interference is associated with a respective duration.

9. The AP of claim 1, wherein the processing system is further configured to cause the AP to:

estimate a duty cycle associated with interference of the wireless channel, wherein performing one or more of the wireless channel selection operation, the network anomaly detection operation, the scheduling operation, or the data rate modification operation is in accordance with the duty cycle.

10. The AP of claim 1, wherein, to perform the data rate modification operation, the processing system is configured to cause the AP to:

modify a rate of communicating data in accordance with the one or more predicted classes of interference of the wireless channel, an interference power level associated with the one or more predicted classes of interference, a duration associated with the one or more predicted classes of interference, or any combination thereof.

11. The AP of claim 1, wherein the processing system is further configured to cause the AP to:

detect one or more trigger conditions, wherein scanning the wireless channel is in accordance with detecting the one or more trigger conditions, the one or more trigger conditions comprising a received signal strength indicator (RSSI) of the wireless channel satisfying a first threshold, a channel congestion metric of the wireless channel satisfying a second threshold, a packet error rate of the wireless channel satisfying third threshold, a timer duration satisfying fourth threshold, or any combination thereof.

12. The AP of claim 1, wherein the one or more predicted classes of interference comprises a wireless local area network (WLAN) class, a continuous wave (CW) class, a frequency hopping spread spectrum (FHSS) class, a microwave oven class, an additive white Gaussian noise (AWGN) class, or an idle class, a ZigBee class, a Thread class, a peripheral device class, or any combination thereof.

13. A method for wireless communications by an access point (AP), comprising:

scanning a wireless channel to obtain a set of time domain samples;

obtaining one or more predicted classes of interference associated with one or more wireless channels including the wireless channel; and performing, in accordance with the one or more predicted classes of interference, one or more of: a wireless channel selection operation, a network anomaly detection operation, a scheduling operation associated with communications by the AP on the wireless channel, or a data modification" operation.

14. The method of claim 13, wherein obtaining the one or more predicted classes of interference comprises:

inputting an output of a fast Fourier transform (FFT) operation performed on the set of time domain samples to a neural network that is trained to output one or more predicted classes of interference associated with one or more wireless channels including the wireless channel, wherein the one or more predicted classes of interference are output by the neural network.

15. The method of claim 14, wherein inputting the output of the FFT operation comprises:

inputting a plurality of sample sets associated with the output of the FFT operation, wherein each sample set of the plurality of sample sets corresponds to a sub channel of the wireless channel, and wherein performing the wireless channel selection operation, the network anomaly detection operation, or the scheduling operation is in accordance with a plurality of predicted classes of interference that are output by the neural network in accordance with inputting the plurality of sample sets.

16. The method of claim 15, wherein performing the scheduling operation comprises:

puncturing a respective sub-channel of the wireless channel in accordance with the one or more predicted classes of interference, an interference power level associated with the one or more predicted classes of interference, a duration associated with the one or more predicted classes of interference, one or more puncturing pattern rules, or any combination thereof, wherein the one or more predicted classes of interference are associated with the respective sub-channel and is included in the plurality of predicted classes.

17. The method of claim 14, further comprising:

inputting one or more received signal strength indicator (RSSI) values, one or more load metrics, an operating frequency, a frequency band, a bandwidth parameter, or any combination thereof to the neural network along with the output of the FFT operation, wherein the performing is in accordance with the one or more RSSI values, the one or more load metrics, the operating frequency, the frequency band, the bandwidth parameter, or any combination thereof.

18. The method of claim 13, wherein performing the wireless channel selection operation comprises:

selecting the wireless channel to use for communications with one or more wireless stations (STAs) in accordance with the one or more predicted classes of interference of the wireless channel.

19. The method of claim 13, wherein performing the network anomaly detection operation comprises:

outputting an indication comprising the one or more predicted classes of interference of the wireless channel, one or more interference power levels associated with each of the one or more predicted classes of interference, or both.

20. The method of claim 19, wherein:

the indication includes a plurality of predicted classes of interference of the wireless channel including the one or more predicted classes of interference and a plurality of interference power levels including the one or more interference power levels, and each predicted class of the plurality of predicted classes of interference is associated with a respective duration.

* * * * *